United States Patent
Agliata et al.

(10) Patent No.: US 11,381,071 B2
(45) Date of Patent: Jul. 5, 2022

(54) VOLTAGE HARVESTER FOR POWER DISTRIBUTION SYSTEM DEVICES

(71) Applicant: Hubbell Incorporated, Shelton, CT (US)

(72) Inventors: Peter Michael Agliata, Birmingham, AL (US); Archana Sadhanala, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/513,855

(22) Filed: Jul. 17, 2019

(65) Prior Publication Data

US 2020/0028351 A1 Jan. 23, 2020

Related U.S. Application Data

(60) Provisional application No. 62/699,426, filed on Jul. 17, 2018.

(51) Int. Cl.
*H02H 7/04* (2006.01)
*H02J 3/00* (2006.01)
*H02H 7/125* (2006.01)

(52) U.S. Cl.
CPC ............. *H02H 7/04* (2013.01); *H02H 7/125* (2013.01); *H02J 3/00* (2013.01)

(58) Field of Classification Search
CPC .............. H02H 7/04; H02H 7/125; H02J 3/00
See application file for complete search history.

(56) References Cited

U.S. PATENT DOCUMENTS

| | | |
|---|---|---|
| 3,167,686 A | 1/1965 | Riebs |
| 4,101,816 A | 7/1978 | Shepter |
| 4,110,711 A * | 8/1978 | Gaetano ................... H03H 7/38 |
| | | 333/32 |
| 4,335,437 A | 6/1982 | Wilson et al. |
| 4,410,808 A | 10/1983 | Woodhouse |
| 4,535,409 A | 8/1985 | Jindrick |
| 4,594,636 A | 6/1986 | Hamer et al. |
| 4,602,309 A | 7/1986 | Gaude |
| 4,658,323 A | 4/1987 | Dougherty |
| 4,670,810 A | 6/1987 | Valeur |
| 4,734,817 A | 3/1988 | Baker et al. |

(Continued)

FOREIGN PATENT DOCUMENTS

| | | |
|---|---|---|
| EP | 0202767 | 11/1986 |
| WO | 20160012899 | 1/2016 |

OTHER PUBLICATIONS

Schweitzer Engineering Laboratories, Inc. Catalog "Take Control of Your Recloser" 20 pages, 2016.

(Continued)

*Primary Examiner* — Scott Bauer

(74) *Attorney, Agent, or Firm* — Wissing Miller LLP

(57) ABSTRACT

The present disclosure provides exemplary embodiments of voltage harvesting devices used in power distribution systems, and provides power distribution system architectures utilizing the voltage harvesting devices. Generally, the voltage harvesting devices transform distribution line AC voltages to produce a low wattage output for distribution system communication and control type devices. The voltage harvesting device can operate whether irrespective of the presence of load current.

29 Claims, 20 Drawing Sheets

(56) References Cited

U.S. PATENT DOCUMENTS

| | | | |
|---|---|---|---|
| 4,771,358 | A | 9/1988 | Millner |
| 4,847,780 | A | 7/1989 | Gilker et al. |
| 4,849,848 | A | 7/1989 | Ishii |
| 4,912,591 | A | 3/1990 | LeCourt |
| 4,931,896 | A | 6/1990 | LeCourt |
| 4,999,730 | A | 3/1991 | Pickard |
| 5,117,325 | A | 5/1992 | Dunk et al. |
| 5,317,469 | A * | 5/1994 | Lu .................. H02H 9/044 361/111 |
| 6,707,655 | B2 | 3/2004 | McElray, Sr. et al. |
| 7,170,762 | B2 * | 1/2007 | Chian ................ H02M 3/3381 363/19 |
| 7,304,872 | B1 | 12/2007 | Yakymyshyn et al. |
| 9,515,561 | B2 * | 12/2016 | Nishijima ......... H02M 3/33523 |
| 10,091,885 | B2 | 10/2018 | Murray et al. |
| 2007/0241727 | A1 * | 10/2007 | Luo .................... H02M 3/1588 323/272 |
| 2012/0176716 | A1 * | 7/2012 | Roy .................. H01L 23/49575 361/111 |
| 2013/0057255 | A1 | 3/2013 | Hou |
| 2013/0249319 | A1 | 9/2013 | Cummings |
| 2014/0183963 | A1 | 7/2014 | Wilson et al. |
| 2014/0327308 | A1 | 11/2014 | Cargile et al. |
| 2015/0208546 | A1 * | 7/2015 | Ikezawa .................. H02M 3/28 361/704 |
| 2017/0202087 | A1 | 7/2017 | Murray |
| 2017/0351280 | A1 | 12/2017 | Fernandez et al. |
| 2018/0143234 | A1 | 5/2018 | Saxby |
| 2018/0212531 | A1 | 7/2018 | Hurwitz et al. |
| 2018/0226896 | A1 * | 8/2018 | Miller ................ H02M 3/3376 |
| 2019/0011940 | A1 | 1/2019 | Fernandez et al. |

OTHER PUBLICATIONS

Schneider Electric Industries, Catalog "N-Series, Three Phase Recloser with ADVC Controller" 52 pages, 2013.

RFL Electronics Inc. Catalog "RFL Gard 21R1 Distance Relay" 16 pages, Apr. 2013.

Nu-Lec Industries, Catalog "N-Series Automatic Circuit Recloser" 12 pages, 2004.

Hubbell Power Systems, Inc. Catalog, Versa-Tech Terminal Unit, "Clever is the New Smart, More Control, Communicaiton, Security" 1 page, 2014.

Hubbell Power Systems, Catalog, Versa-Tech Reclosers 28 pages, Jun. 2018.

Eaton Cooper Power Systems, Catalog, "Reclosers and Controls" 159 pages, 2014.

Eaton Powering Business Worldwide, Cooper Power Series, Catalog, "Reclosers" 12 pages, Jun. 2017.

Eaton Powering Business Worldwide, Cooper Power Series, Catalog, "A Simple and Cost-Effective Solution for Everyday Protection Requirements" 2 pages, Sep. 2017.

Eaton Powering Business Worldwide, Cooper Power Series, Catalog, "Nova Three-phase, Microprocessor-controlled closer" 12 pages, Mar. 2015.

Cooper Power Systems, Catalog, Reclosers, "Form 6 Microprocessor-Based Pole-Mount Recloser Control Installation and Operation Instructions", 56 pages, Oct. 2012.

Cooper Power Systems, Catalog, Reclosers, "Type LS Loop Sectionalizing Control Accessory for the Form 4C Recloser Control; Installation and Operation Instructions", 20 pages, Apr. 2001.

ABB, Customer Presentation, Cost Effective Single-Phase Recloser, "OVR-1 Single Phase Recloser" 16 pages, Jul. 2007.

International Search Report and Written Opinion mailed in PCT/US19/042122 by ISA/US dated Oct. 4, 2019.

International Preliminary Report on Patentability mailed in PCT/US19/042122 by ISA/US dated Jan. 28, 2021.

Watson Brett: "A Novel Voltage Based Approach to Self Powering the Next Generation of Smart, Compact and Communicable Auto-Reclosers for Distribution Networks", 2018 IEEE/PES Transmission and Distribution Conference and Exposition (T&D), IEEE, Apr. 16, 2018 (Apr. 16, 2018), pp. 1-9.

Gregory A Franklin et al: "Power line carrier impedance matching monitor", IEEE Southeastcon 2010 (Southeastcon), Proceedings of The, IEEE, Piscataway, NJ, USA, Mar. 18, 2010 (Mar. 18, 2010), pp. 255-258.

Extended European Search Report mailed in corresponding EP 19838254 dated Mar. 22, 2022 (11 pages).

* cited by examiner

VOLTAGE HARVESTER FOR POWER DISTRIBUTION SYSTEM DEVICES

CROSS-REFERENCE TO RELATED APPLICATIONS

The present disclosure is based on and claims benefit from U.S. Provisional Patent Application Ser. No. 62/699,426 filed on Jul. 17, 2018 entitled "Voltage Harvester for Power Distribution System Devices" the contents of which are incorporated herein in their entirety by reference.

BACKGROUND

Field

The present disclosure relates generally to voltage harvesting devices used in power distribution systems and to power system architectures utilizing the voltage harvesting devices. The voltage harvesting devices transform distribution system voltages to power distribution system communication and control type devices that utilize or consume low power.

Description of the Related Art

A frequent problem in almost any electrical power distribution system is a momentary disruption of electrical service that may be caused by environmental conditions. For example, 1) lightening may strike in the vicinity of power lines, or 2) wind may cause power lines strung between poles to momentarily touch each other or to touch a grounded conductor shorting the lines, or 3) objects may fall across exposed wires and short the lines. Such events may cause a momentary power line short circuit or current surge. Most of these faults are self-correcting and do not significantly disrupt power distribution. However, some events are more serious and can trigger fault-interrupting devices to trip, causing a more serious power disruption.

For example, reclosers are inserted into power lines to protect a power distribution system. A recloser is a fault-interrupting device used to sense current, voltage, and/or frequency and isolate faulted portions of power distribution conductors. A recloser control device operates a recloser, which can be an electronic controller that operates with a low wattage input. Typically, such electronic controllers are located within a control box and derive their operating power from a large step-down transformer on the source side of the power distribution lines the recloser is protecting. This requires separate installation and maintenance. Electronic controllers located within the recloser as well as those within a control box also utilize a power storage component to operate the recloser when the recloser trips. Such stored power sources are batteries and capacitors that discharge when the recloser trips. In addition, the electronic controllers often include communication devices that are also powered by the step-down transformers and back-up battery supplies. Likewise, live tank devices utilize current transformers to harvest power from line current in order to operate and communicate when lines are loaded. Utilizing a separate step-down transformer and stored power source significantly increase the cost and maintenance requirements to protect the power distribution lines. In the case of a live tank device, requiring lines to be constantly loaded is not realistic. Thus, a need exists for a compact, lower cost alternative to the separate step-down transformer, power storage component, and line load requirements to provide operating power to reclosers, controllers, communication devices, and other devices used in power distribution systems that rely on low voltage, low power inputs.

SUMMARY

The present disclosure provides exemplary embodiments of voltage harvesting devices used in power distribution systems. The present disclosure also provides exemplary embodiments of power distribution system architectures utilizing the voltage harvesting devices. The present disclosure also provides exemplary embodiments of transformation circuits that can be incorporated into the voltage harvesting devices of the present disclosure, such as an insulator utilized in conventional power distribution system components. Generally, the voltage harvesting devices and the transformation circuits according to the present disclosure transform loaded or unloaded live line voltages to produce output power that can be used to supply operating power for power distribution system communication and control type devices that utilize or consume low power.

In an exemplary embodiment, the voltage harvesting device includes a housing and a transformation circuit embedded in or encased within the housing. The transformation circuit includes a first impedance component and a second impedance component arranged as a voltage divider such that the transformation circuit has an output AC voltage that is a factor of about 0.1 percent to about 5 percent of a source line voltage. In this exemplary embodiment, the first impedance component is a transformer, and the second impedance component is a resistor.

In another exemplary embodiment, the transformation circuit includes a resistor and a transformer. The transformer has a first terminal for connecting to a line voltage source and a second terminal connected to a first terminal of the resistor. The resistor has a second terminal for connecting to actual ground. A secondary winding of the transformer sits at line potential so that it has a floating ground reference and outputs an AC voltage in the range of about 25-250 VAC relative to the line voltage source.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 2:
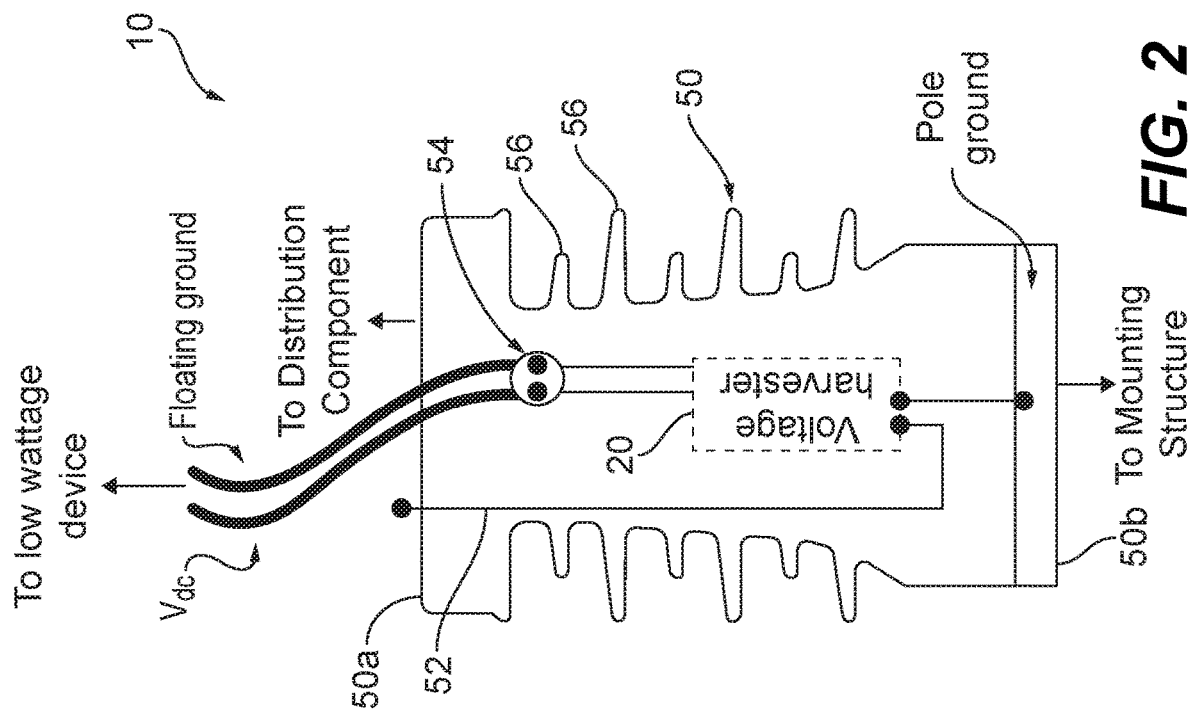
FIG. 2 is a side elevation view of the voltage harvesting device of FIG. 1.

The present disclosure provides exemplary embodiments of voltage harvesting devices used in power distribution systems and power distribution system architectures utilizing the voltage harvesting devices. Generally, the voltage harvesting device according to the present disclosure transforms distribution line voltages to produce low output power for power distribution system devices. More specifically, the voltage harvesting device utilizes available high voltage AC on power distribution conductors to provide low voltage electrical power for communication and control type devices without the use or cost of a dedicated step-down transformer or other power source, such as a battery or a capacitor. The voltage harvesting device can be distributed individually, as part of a power distribution system type component kit, or the voltage harvesting device can be integrated with or into various power distribution system type devices. For example, the voltage harvesting device may be incorporated into an insulator and installed with a recloser.

The power distribution system communication and control type devices contemplated by the present disclosure include, but are not limited to, recloser control systems, communication systems for smart-grid applications, pole-mounted remote terminal units (RTUs) that communicate via cellular, WiFi, Ethernet, mesh networks, and other communication methods to a central system, such as SCADA or the IEC 61850 standard defining communication protocols. For ease of description, the power distribution system communication and control type devices may also be referred to herein collectively as the "control devices" in the plural and as the "control device" in the singular.

In addition, the power distribution system type components and associated control devices contemplated by the present disclosure include, but are not limited to, line disconnects, fault interrupters, power line monitors, power factor correction devices, and load switching devices and other overhead distribution switches, insulators, and arresters. Non-limiting examples of line disconnects includes sectionalizers. Non-limiting examples of fault interrupters include breakers and reclosers. Non-limiting examples of power line monitors includes sensors and fault locators. Non-limiting examples of power factor correction devices include capacitor switches. Non-limiting examples of load switching devices include load-break switches. For ease of description, the power distribution system type components may also be referred to herein collectively as the "distribution components" in the plural and the "distribution component" in the singular.

Referring to FIGS. 1-4 and 4A, exemplary embodiments of a voltage harvesting device according to the present disclosure are shown. The voltage harvesting device 10 includes voltage harvesting circuitry enclosed in or encased in a housing 50. In one embodiment, the voltage harvesting circuitry includes transformation circuitry 20. In other embodiments, the voltage harvesting circuitry includes the transformation circuitry 20 and other circuit components as described in more detail below.

Figure 4:
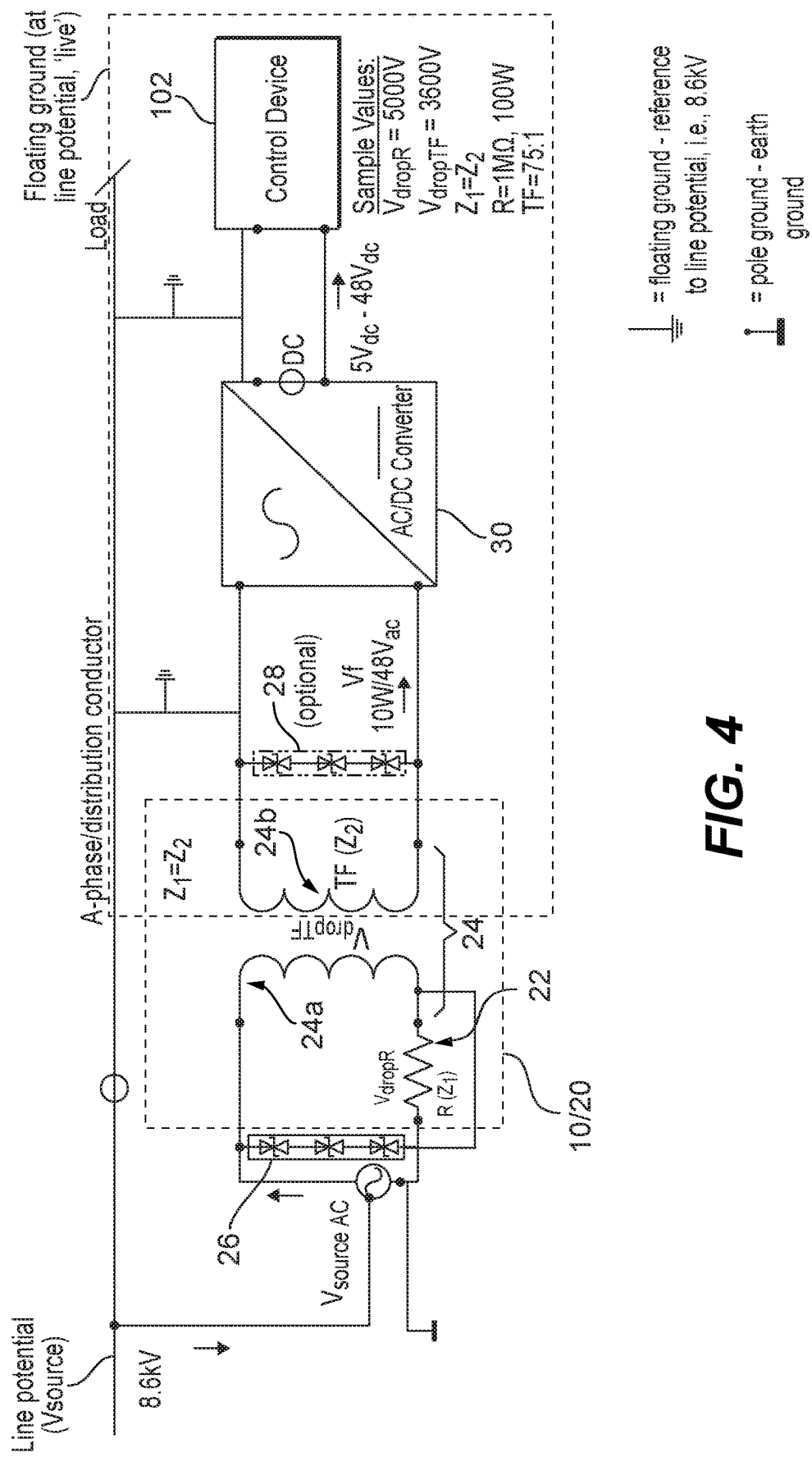
FIG. 4 is an exemplary circuit diagram of the internal components of the circuit of FIG. 3.

Referring to FIG. 4, the transformation circuitry 20 is used to transform high voltage AC on high voltage transmission or distribution conductors to an output power level that can be used to supply operating power for control devices whether or not there is line current (load) on the high voltage distribution conductor. In one exemplary embodiment, seen in FIG. 4, the transformation circuitry 20 includes a resistor 22 and a transformer 24. The transformer 24 is connected between the line voltage (Vsource) and one side of the resistor 22, as shown. The other side of the resistor 22 is connected to pole ground. It is noted that pole ground is earth ground, actual ground or the like. In the exemplary embodiment of FIG. 4, the resistor 22 drops the line voltage (Vsource) by a large factor dependent on the source line voltage. For example, a 15 kV single phase line voltage, or 8.66 kV, may be dropped by a factor ranging between about 4.0 kV to about 7.5 kV across the resistor 22. The voltage drop factor may range from about 45-95% of the single phase source voltage. Further, since the resistor 22 is connected in series with the primary winding 24a of the transformer 24, the resistor 22 is subjected to and configured to handling a high continuous wattage. The wattage is dependent upon a number of factors including the resistor size and construction, e.g., parallel configuration. As an example, the high continuous wattage may be in the range of between about 20 W to about 100 W. However, this wattage may change dependent on the line voltage and the output requirements of the circuit. As a non-limiting example, for a single-phase line voltage of 8.6 kV the high continuous wattage may be about 60 W.

Figure 4A:
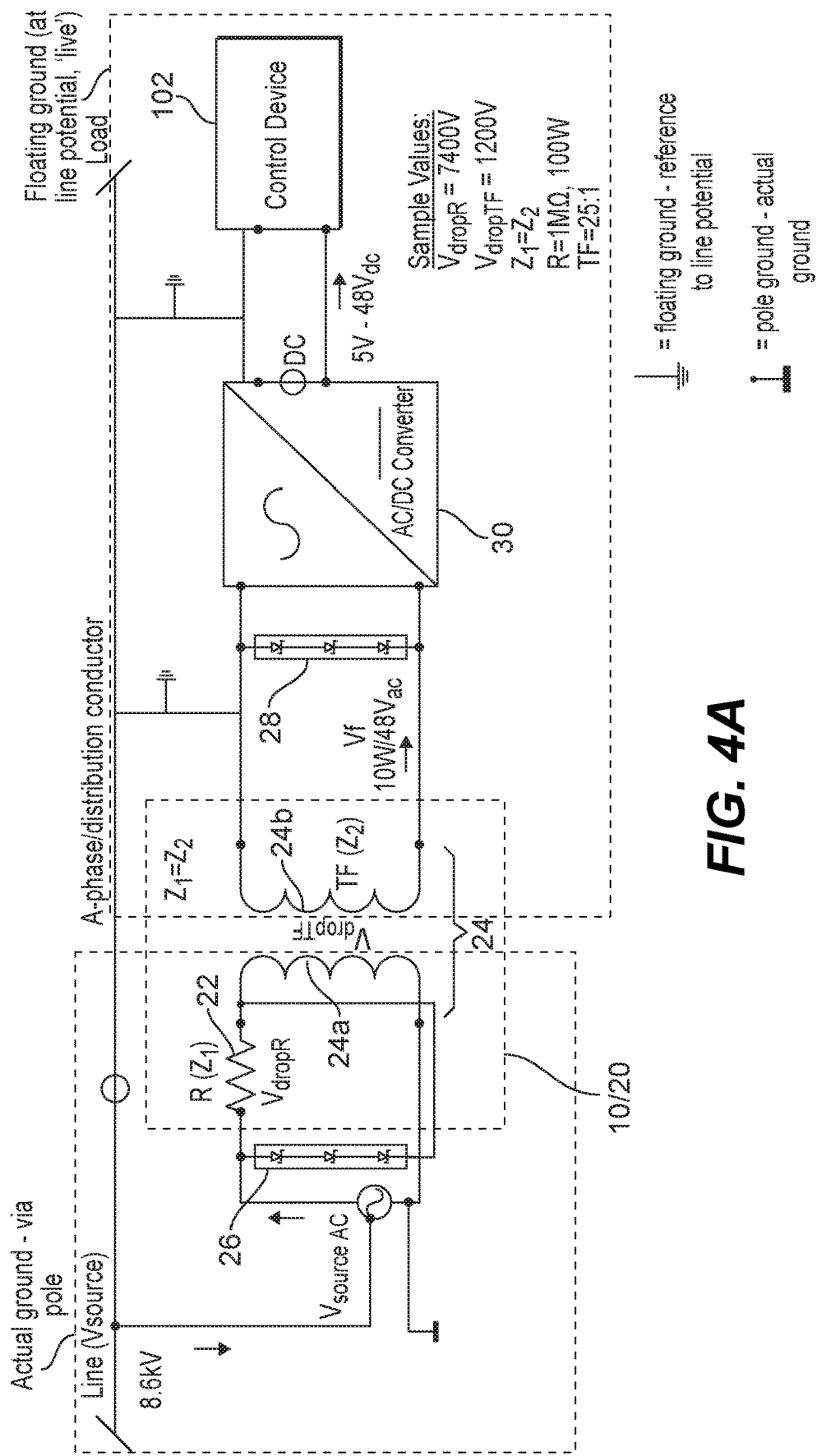
FIG. 4A is another exemplary circuit diagram of the internal components of the circuit of FIG. 3.
Figure 5:
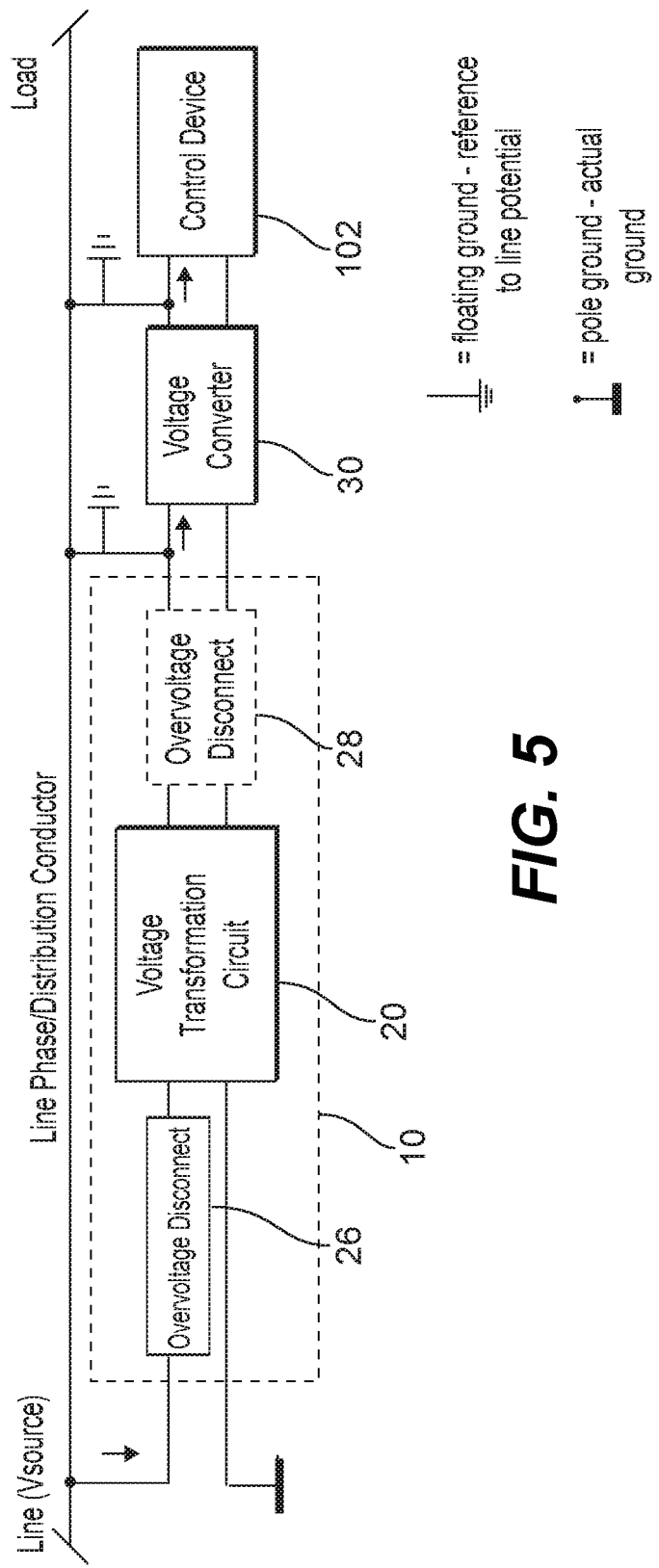
FIG. 5 is a block diagram of another exemplary embodiment of a circuit including the voltage harvesting device of the present disclosure and used to transform a high voltage, high wattage source to a low voltage, low wattage power source for control devices.
Figure 6:
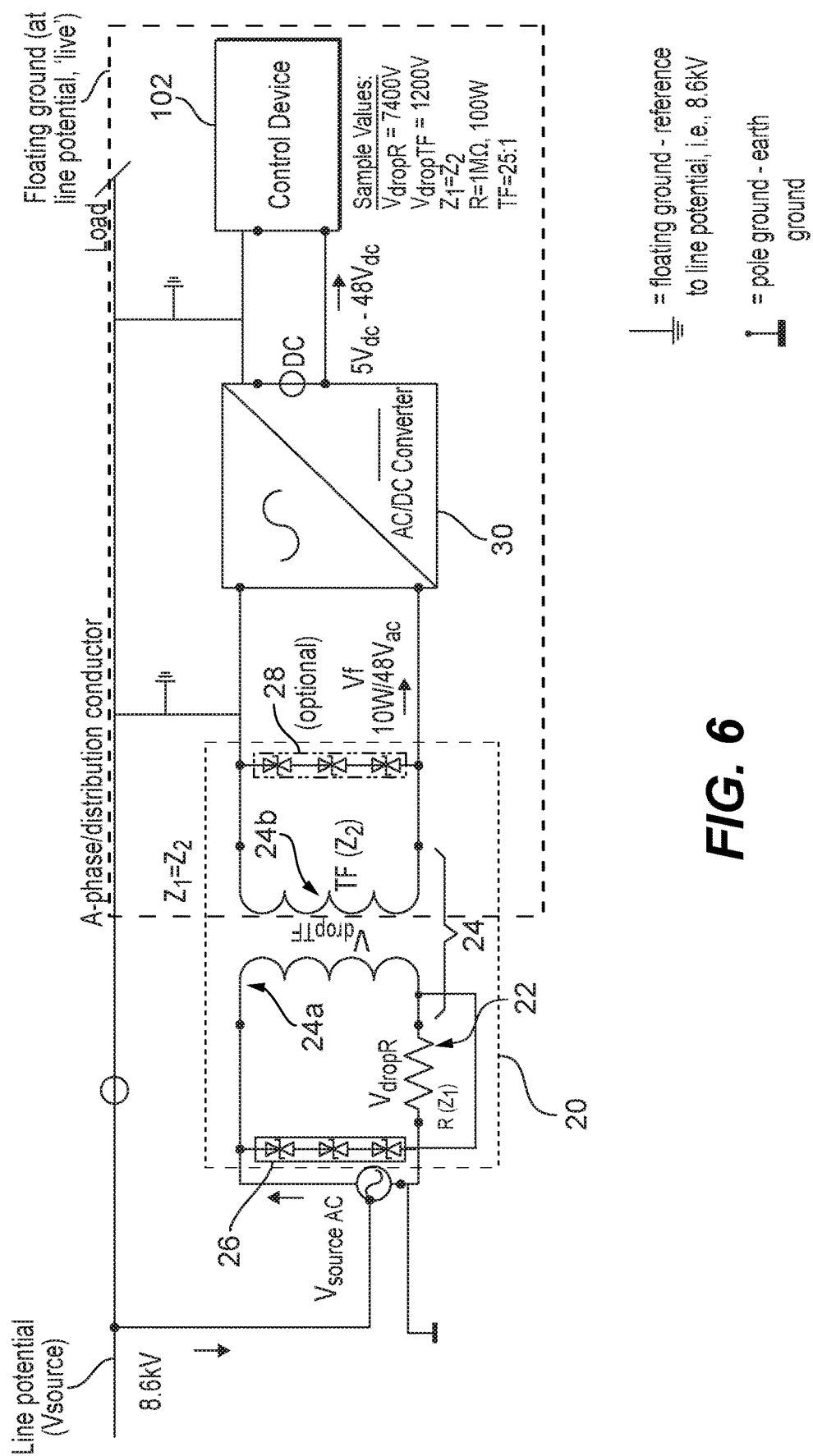
FIG. 6 is an exemplary circuit diagram of the internal components of the circuit of FIG. 5.
Figure 6A:
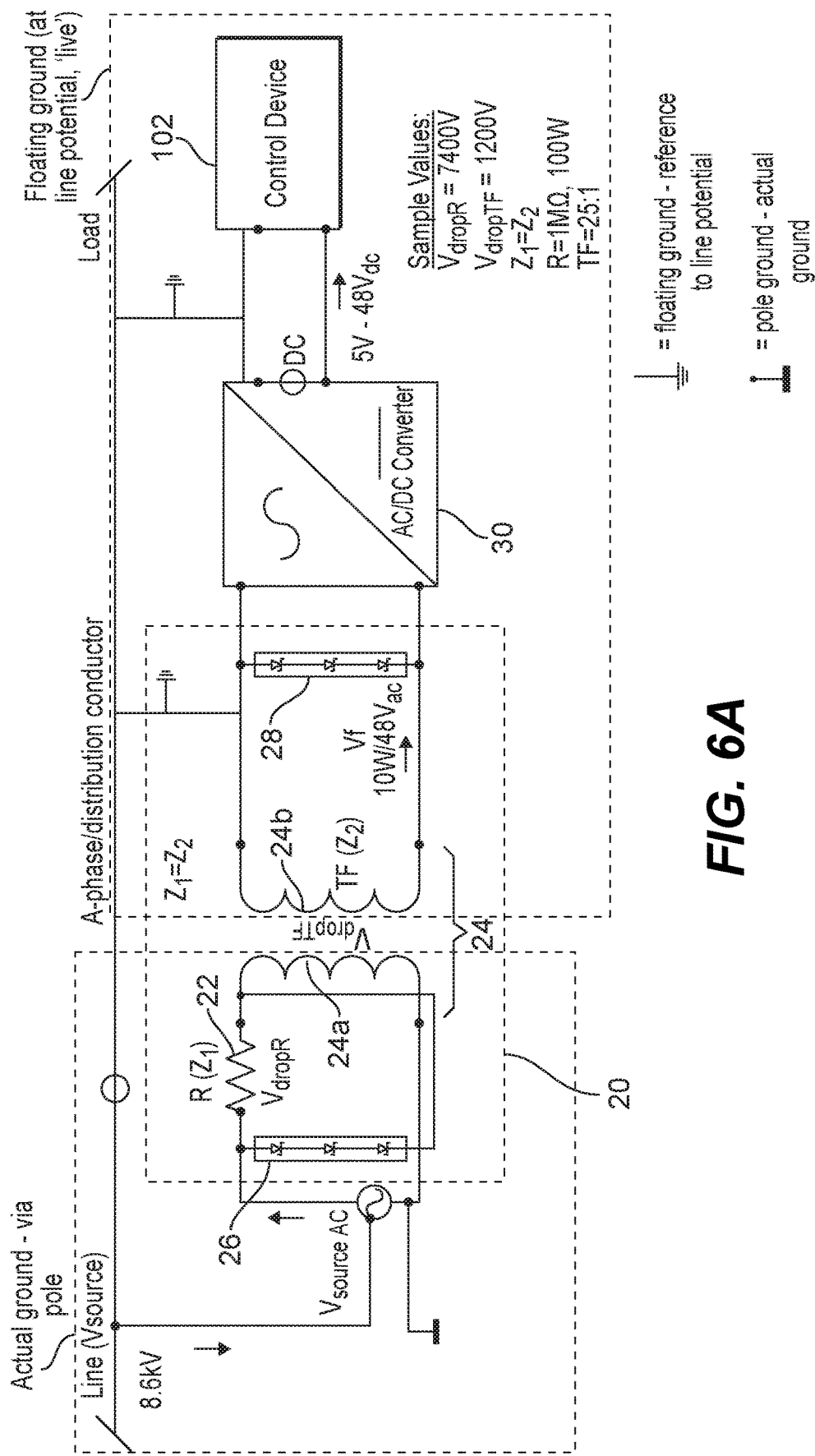
FIG. 6A is another exemplary circuit diagram of the internal components of the circuit of FIG. 5.
Figure 7:
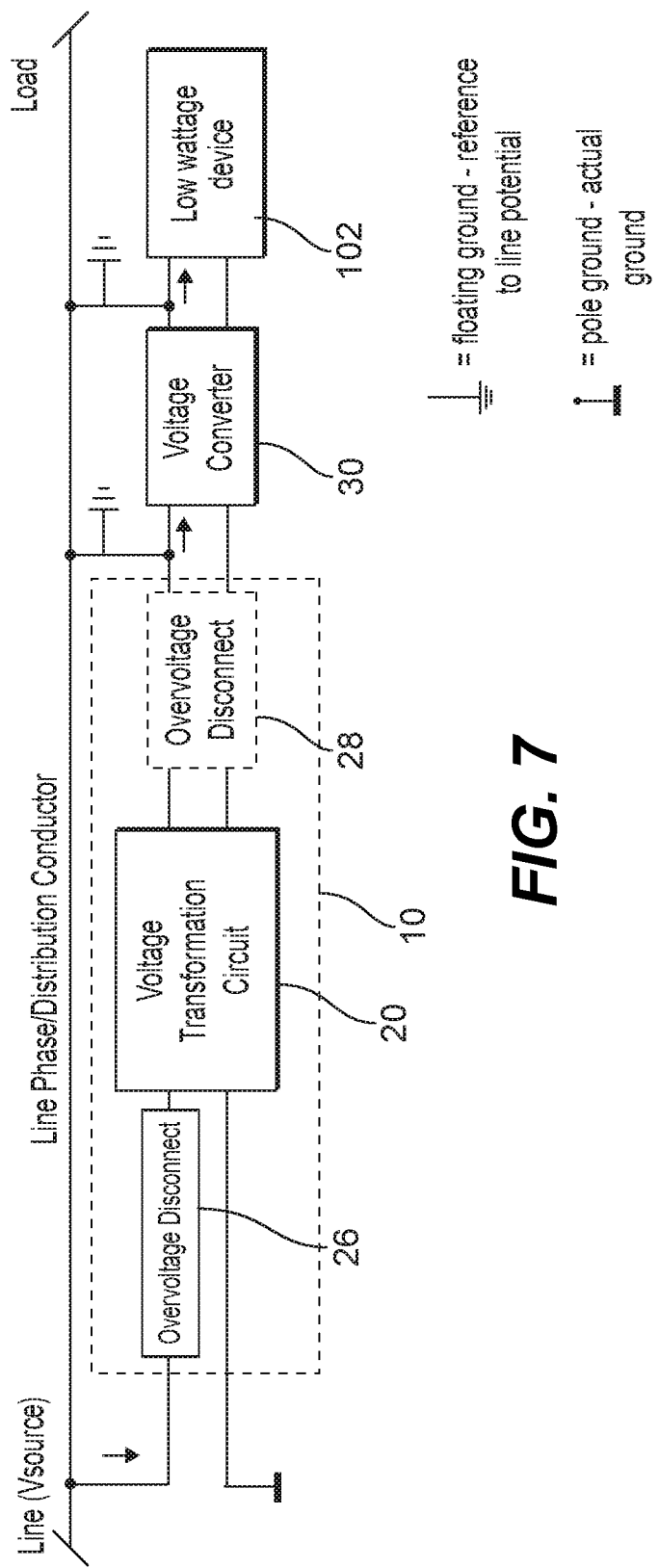
FIG. 7 is a block diagram of another exemplary embodiment of a circuit including the voltage harvesting device of the present disclosure and used to transform a high voltage, high wattage source to a low voltage, low wattage power source for control devices.

Referring to FIG. 4A, the transformation circuitry 20 is used to transform high voltage AC on high voltage transmission or distribution conductors to an output power level that can be used to supply operating power for control devices whether or not there is line current (load) on the high voltage distribution conductor. In one exemplary embodiment, seen in FIG. 4A, the transformation circuitry 20 includes a resistor 22 and a transformer 24. The resistor 22 is connected between the line voltage (Vsource) and one side of the primary winding 24a of the transformer 24, as shown. The other side of the primary winding 24a of the transformer 24 is connected to pole ground. It is noted that pole ground is earth ground, actual ground or the like. In the exemplary embodiment of FIG. 4A, the resistor 22 drops the line voltage (Vsource) by a large factor dependent on the source line voltage. For example, a 15 kV single phase line voltage, or 8.66 kV, may be dropped by a factor ranging between about 4 kV to about 7.5 kV across the resistor 22. The voltage drop factor may range from about 80-95% of the single phase source voltage. Further, since the resistor 22 is connected to the line voltage (Vsource), the resistor 22 is subjected to and configured to handling a high continuous wattage. The wattage is dependent upon a number of factors including the resistor size and construction, e.g., parallel configuration. As an example, the high continuous wattage may be in the range of between about 20 W to about 100 W. However, this wattage may change dependent on the line voltage and the output requirements of the circuit. As a non-limiting example, for a single-phase line voltage of 8.6 kV the high continuous wattage may be about 60 W.

As mentioned previously, the transformer 24 is provided to drop the high voltage across the resistor 22 by a factor ranging between about 1.2 kV to about 35 kV and, additionally to drop the voltage across the transformer by a factor ranging between about 1 kV to about 18 kV such that the output AC voltage of the entire transformation circuit 20 is a factor of between about 0.1 percent and about 5 percent of the line voltage source. In the exemplary embodiment described herein the output AC voltage of the transformation circuit 20 is about 25-250V relative to the source line voltage (Vsource). It should be understood that for higher source line voltages, additional resistors 22 or transformers 24 may be added in series or parallel in order to accommodate the larger voltage drops and to handle the higher wattages. For example, if the line voltage (Vsource) fed to the resistor 22 is about 8.66 kV, the voltage drop across the resistor 22 will be about 7.4 kV, and the voltage drop across the transformer primary is 1.2 kV, then the transformer 24 may output 48 VAC at about 10 watts of power. However, the properties of the transformer 24 may vary depending upon a number of factors including the source line voltage (Vsource), the high continuous wattage, line impedances, winding impedances, core impedances, the desired output voltage, the desired output wattage, and other properties associated with the transformer 24. Non-limiting examples of the transformer properties include: size of the core of the transformer, the material used to form the core, the gauge of the wire windings around the core, the insulation surrounding the wire windings, and the number of windings for the primary and secondary (i.e., turns ratio). As a non-limiting example, a suitable size of the core may be in the range of a few inches to about 20 inches in length and height and few inches to about 10 inches in width and can be in any shape capable of fitting within the housing dimensions. Non-limiting examples of suitable materials for forming the core include conductive, magnetic, highly permeable, metallic material with low coercivity and hysteresis, such as iron (ferrite), steel, silicon, or any combination thereof. As a non-limiting example, the wire gauge of the wire windings around the core of the transformer may range from about 10 gauge to about 32 gauge. As a non-limiting example, the thickness of the wire insulation surrounding wire forming the core may range from about 1 mm to about 10 cm thick. As a non-limiting example, the primary to secondary ratio of the core may range from about 25:1 (25 to 1), seen in FIG. 4A to about 75:1 (75 to 1), seen in FIG. 4, though it should be understood by a person skilled in the art that this ratio can change dependent on the secondary load requirement, the form factor of the housing, and the source voltage. These and other properties should be sufficient to transform the high line voltage (Vsource) to a lower output AC voltage.

Continuing to refer to FIGS. 4 and 4A, the secondary winding 24b of the transformer 24 in the transformation circuit 20 sits at line potential so that it has a floating ground reference. As a result, while it may appear that the transformation circuit 20 steps down the line voltage (Vsource), the transformation circuit 20 steps up the line voltage by a voltage factor, which is relatively small compared to the line voltage (Vsource). For example, in the exemplary embodiment shown in FIG. 4, the voltage factor is about 48 VAC such that the output voltage (Vf) of the transformation circuit 20 is about 8.708 VAC (i.e., 8.66 kV single phase line voltage plus 48 VAC output) with reference to actual ground.

The resistor 22 and the transformer 24 of the transformation circuit 20 shown in FIGS. 4 and 4A create an impedance-matched voltage divider. As noted above, the properties of the resistor 22 and the transformer 24 can vary and can be selected based upon the input line voltage (Vsource), the high continuous input power, the desired output voltage (Vf) and the desired output wattage of the voltage harvesting device 10. As a non-limiting example, for a transformation circuit 20 rated for an 8.66 kV single-phase voltage (15 kV three-phase voltage), the resistor 22 may be sized from about 500 kΩ to about 2 MΩ in order to provide a voltage drop of about 7400 VAC, at about 60 W to about 100 W continuous watts. In addition, the properties for the transformer 24 may be designed with a 75:1 ratio (FIG. 4) and a 25:1 (FIG. 4A), using a silicon steel or equivalent core with 22-gauge wire having an insulation thickness of about 2 mm, in order to provide a 1200V drop across the primary windings of the transformer 24. It is noted that a higher turns ratio may be utilized to reduce the continuous wattage across the resistor 22.

Referring again to FIGS. 1 and 2, an exemplary embodiment of the housing 50 of the voltage harvesting device 10 is shown. The housing 50 may come in various shapes and sizes depending upon a number of factors, including the components, e.g., the resistor 22 and the transformer 24, used in the transformation circuit 20, the source line voltage (Vsource), the desired output voltage of the voltage harvesting circuitry, and the desired output power of the voltage harvesting circuitry. Generally, as a non-limiting example, the dimensions of the housing 50 may range from about 12"×5"×5" to about 15"×8"×8" or larger, dependent on the core dimensions of the transformer 24. As a specific example, for an 8.66 kV single-phase line voltage, the resistor 22 may be about 13 inches in length, about 4 inches in width and about 5 inches in height, and the transformer 24 may be about 10 inches in length, about 3-4 inches in width and about 2 inches in height, which would result in a housing 50 of about 8 inches in length, about 3 inches in width and about 1 inches in height.

Figure 1:
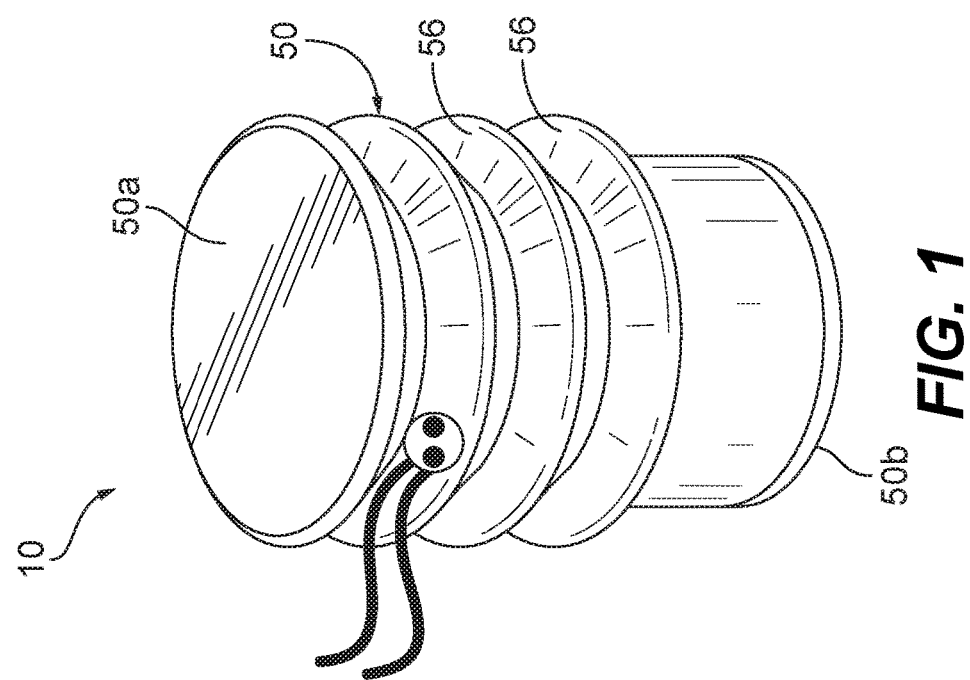
FIG. 1 is a perspective view of an exemplary embodiment of a stand-alone voltage harvesting device housing according to the present disclosure.
Figure 3:
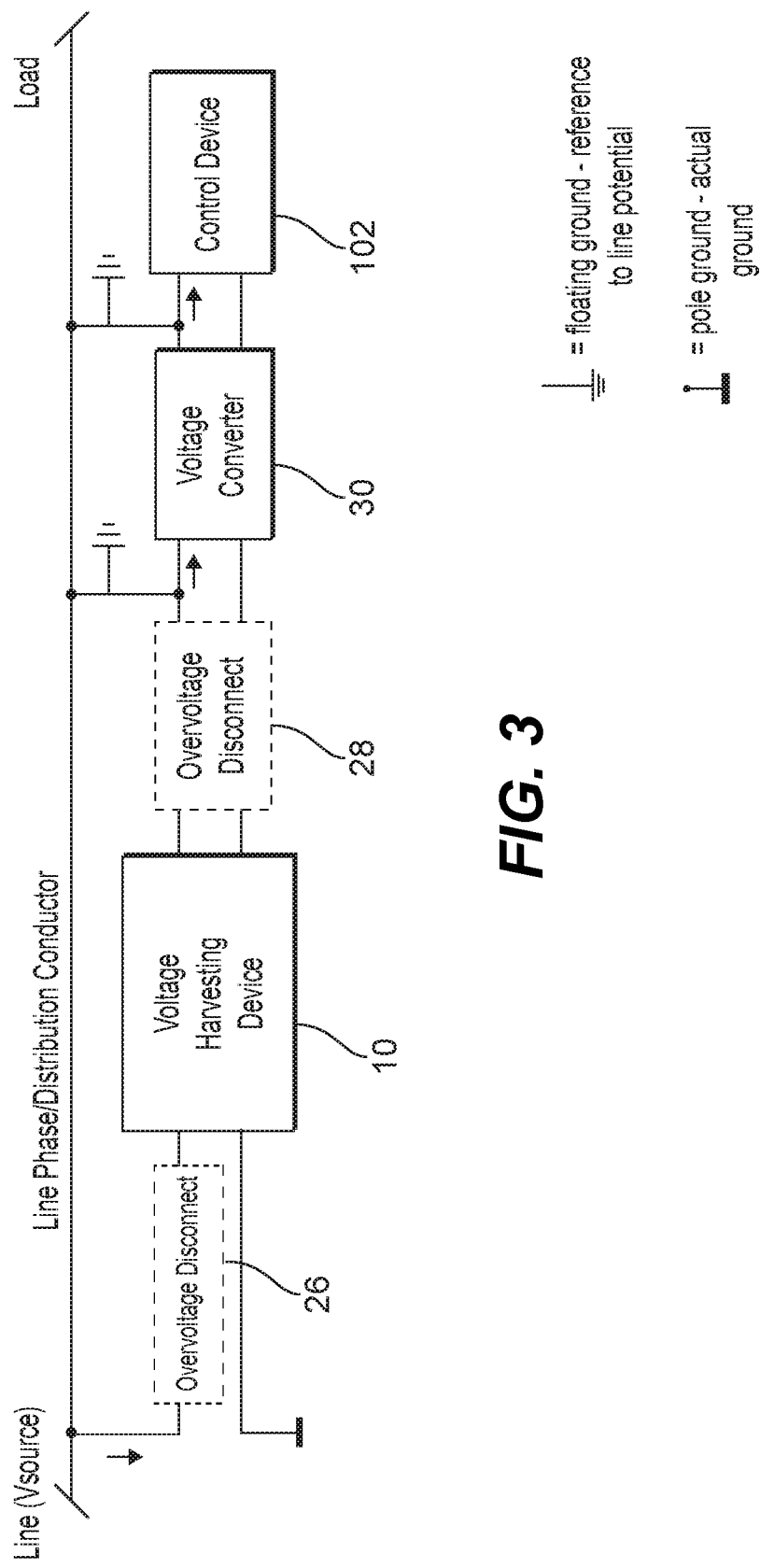
FIG. 3 is a block diagram of an exemplary embodiment of a circuit including the voltage harvesting device of the present disclosure and used to transform a high voltage, high wattage source to a low voltage, low wattage power source for control devices.
Figure 11:
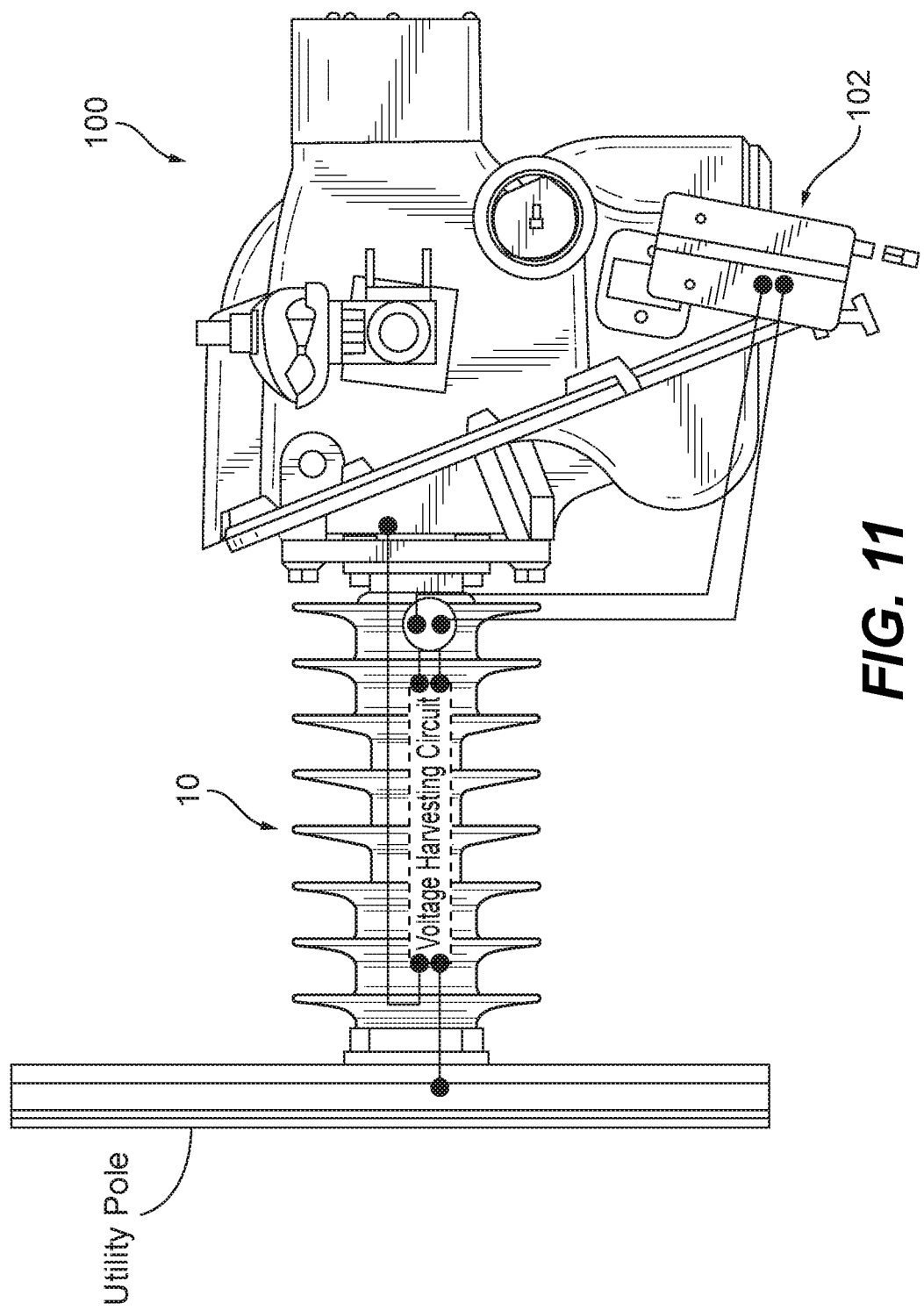
FIG. 11 is a side elevation view of an exemplary embodiment of the voltage harvesting device of FIG. 1 secured to both a utility pole and a recloser and further attached to a control device.
Figure 12:
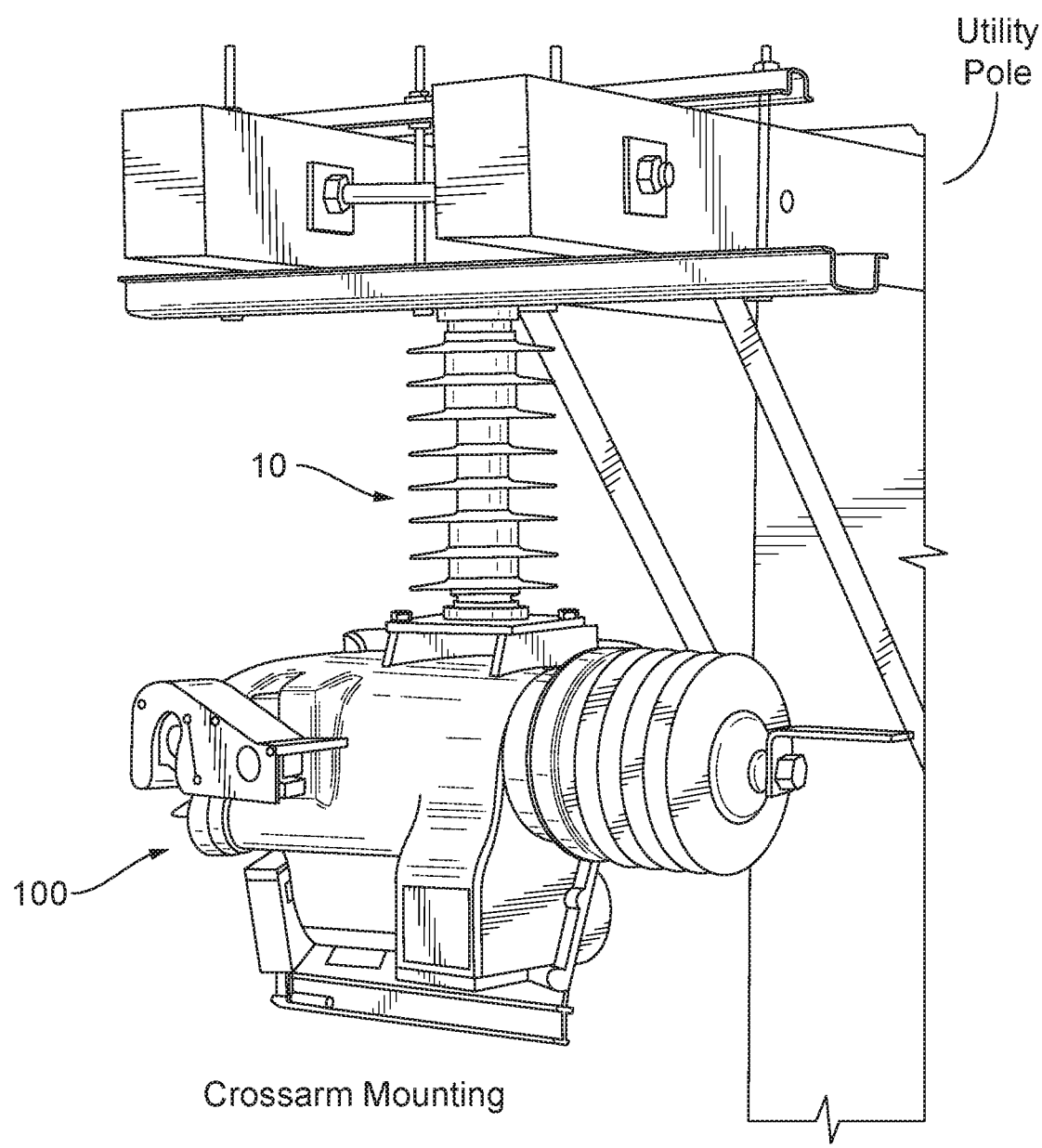
FIG. 12 is a side perspective view of another exemplary embodiment of the voltage harvesting device of FIG. 1 secured to a utility pole with a cross-arm mounting structure and a recloser attached to the voltage harvesting device.

Continuing to refer to FIGS. 1 and 2, the housing 50 may have a flat upper surface 50a that permits a distribution component 100, e.g., a recloser, to be connected to the housing 50, as seen in FIGS. 11 and 12. The housing 50 may have a flat lower surface 50b that permits the voltage harvesting device 10 to be connected to a mounting structure 110, as seen in FIGS. 11 and 12. A terminal connector 52 may extending from the housing 50 and can be used to connect the input side of the voltage harvesting device 10 to the line voltage (Vsource). A terminal 54, e.g., a pin terminal, may also extend from the housing 50 and can be used to connect the output side of the voltage harvesting device 10 to a subsequent component, such as an overvoltage circuit 28, a voltage converter 30 or a control device 102, e.g., a low wattage control device, described below and seen in FIG. 3.

The transformation circuit 20 of the voltage harvesting circuitry may be potted or otherwise formed in an insulating material forming the housing 50. Non-limiting examples of insulating materials include, cycloaliphatic epoxy, resin, polymer, porcelain and/or other insulating material known in the art that is durable, weather resistant and that allows for sufficient dissipation of heat generated by the transformation circuitry 20, such as through sheds 56 of various diameters, seen in FIGS. 1 and 2.

Referring again to refer to FIGS. 3 and 4, the transformation circuitry 20 described above forms the voltage harvesting circuitry within the voltage harvesting device 10. To protect the voltage harvesting device 10 from excessive voltages and transients, a first overvoltage disconnect device 26 may be connected to the input side of the transformation circuitry 20. In other words, the first overvoltage disconnect device 26 may be connected between the line voltage (Vsource) and the transformation circuitry 20. The first overvoltage disconnect device 26 would be provided to protect the transformation circuit 20 from overvoltage conditions, such as those caused by transients, faults or other disturbances on the line as is known in the art. Non-limiting examples of the first overvoltage disconnect device 26 include, daisy-chained TVS diodes, FETs, PTC fuses, and/or similar components and associated circuitry capable of providing overvoltage protection. In the exemplary embodiment of FIG. 4, the first overvoltage disconnect device 26 is a series of daisy-chained TVS diodes or similar circuit connected in parallel with the transformation circuit 20.

An optional second overvoltage disconnect device 28 may be connected to the output side of the transformation circuitry 20, i.e., between the output of the transformation circuit 20 and subsequent circuitry coupled to the voltage harvesting device 10. The second overvoltage disconnect device 28 may be provided to protect the output side of the transformation circuit 20 from overvoltage conditions, so that large line voltage or current disturbances are not experienced across the secondary of the transformation circuit 20 as is known. Non-limiting examples of the second overvoltage disconnect device include, daisy-chained bidirectional TVS diodes, FETs, fuse, PTC fuses, diodes, and/or similar components and associated circuitry capable of providing overvoltage and overcurrent protection. In the exemplary embodiment of FIG. 4, the second overvoltage disconnect device 28 is a series of daisy-chained bidirectional TVS diodes connected in parallel with the output of the transformation circuit 20 as shown. In one embodiment, the second overvoltage disconnect 28 may be included within the control device 102 instead of the voltage harvesting device circuitry.

To convert the output AC voltage (Vf) of the transformation circuit 20 to a DC voltage for the control device 102, a voltage converter 30 may be connected to the voltage harvesting device 10 or the optional second overvoltage disconnect device 28. The voltage converter 30 may be a conventional AC/DC converter or other device or circuitry capable for converting AC voltage to DC voltage. In the exemplary embodiment of FIG. 4, the voltage converted 30 converts the 48 VAC output (Vf) from the transformation circuit 20 to provide a 48 VDC operating voltage for the control device 102. In the exemplary embodiments of FIGS. 9 and 10, the voltage converter 30 converts the 48 VAC output voltage (Vf) from the transformation circuit 20 to provides a 5 VDC operating voltage at 2.5 watts for the control device 102.

The circuit of FIG. 4, with a line voltage (Vsource) of 8.66 kV AC operates in the following manner. The line voltage (Vsource) is fed into the transformation circuit 20 having a MO resistor 22 and the ground is earth ground, via e.g., a utility pole ground. The voltage drop across the resistor 22 reduces the 8.66 kV to 1.2 kV, which is a voltage drop of about 7400V. The 1.2 kV is fed to the transformer 24 (having approximately a 25:1 primary to secondary ratio), which drops the 1.2 kV to output a voltage (Vf) of about 48 VAC at about 10 W. That is, the secondary of the transformer 24 in the transformation circuit 20 outputs about 48 VAC at 10 W. The impedance of the resistor 22 and the transformer 24 should be matched so that the wattage created from the current flowing through the transformation circuit 20 does not drop. It is noted that in the configuration shown, the secondary of the transformer and the remaining portions of the circuit are held at line potential, acting as floating ground reference. As a result, the output of the transformation circuit 20 (Vf) is approximately 8708V. However, with the floating ground being at approximately 8.66 kV the effective output voltage of the transformation circuit 20 is about 48 VAC. Thus, the additional step 'up' from the line voltage potential is what achieves the voltage harvesting from the line potential whether or not there is a load present on the line. The output voltage (Vf) of the transformation circuit 20, e.g., the 48 VAC, is then input into the AC to DC converter 30 which can have characteristics that convert the 48 VAC to the same or a lower DC voltage so that the converter outputs a DC voltage for a prescribed application as is known. For example, to power a control device 102 that is a communication radio for a recloser as the distribution component 100, may require approximately 5 VDC at 2.5 W. In such an example, the voltage converter 30 would be configured to convert the 48 VAC at about 10 W to 5 VDC at about 2.5 W. The 5 VDC at about 2.5 W output of the voltage converter 30 is then fed into the communication radio 102, also sitting at line potential, to continuously power the communication radio 102 whether or not a load current is present on the line.

As noted above, in the event line voltage exceeds a certain threshold, e.g., 95 kV, the first overvoltage disconnect device 26 would short to effectively disconnect the transformation circuit 20 from the line overvoltage condition This overvoltage value may be higher or lower depending on, for example, the corresponding rated line voltage (Vsource) where it is being utilized, the amount of the voltage seen across the primary winding of the transformer (or resistor, depending on which circuit is being considered, e.g., FIGS. 4, 6, 8 or FIGS. 4A, 6A, 8A). As noted above, in the event the secondary voltage or current, i.e., on the output side of the transformation circuit 20, exceeds a certain threshold, e.g., 50V to 8.6 kV, the second overvoltage disconnect device 28 would short to effectively disconnect the transformation circuit 20 from the output side overvoltage condition. The secondary overvoltage disconnect includes a range of values that depend on, for example, the nominal line voltage of the line on which it is utilized and the output voltage being supplied to the converter. The second overvoltage disconnect serves to protect the additional components, i.e., the AC/DC converter 30 and control device 102 in the case where the transformer or resistor/capacitor/inductor fails or in the case of an overvoltage event on the line which effectively raises the 'ground' line potential of the circuit.

Turning now to FIGS. 5, 6, 6A, 7, 8 and 8A, additional exemplary embodiments of the circuitry that may be included in the voltage harvesting device 10 according to the present disclosure are shown. In the exemplary embodiment of FIGS. 5, 6 and 6A, the voltage harvesting circuitry includes the overvoltage disconnect 26. The overvoltage disconnect 28 may or may not be included in the voltage harvesting circuitry, and the voltage converter 30 is external to the voltage harvesting device 10. In the exemplary embodiment of FIGS. 7, 8 and 8A, the voltage harvesting circuitry includes the overvoltage disconnect 26 and the voltage converter 30. The overvoltage disconnect 28 may or may not be included in the voltage harvesting device 10.

Figure 8:
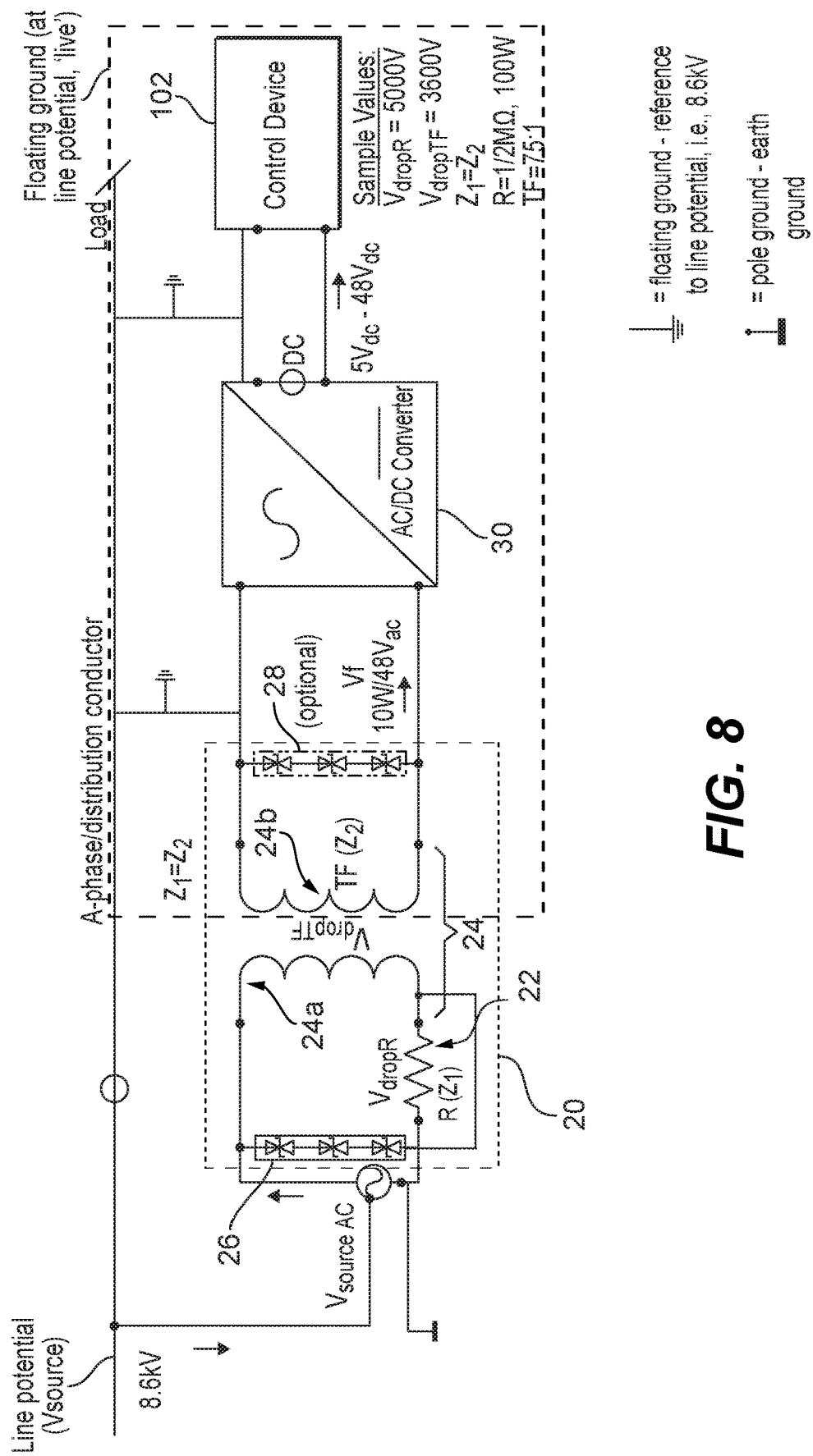
FIG. 8 is an exemplary circuit diagram of the internal components of the circuit of FIG. 7.
Figure 8A:
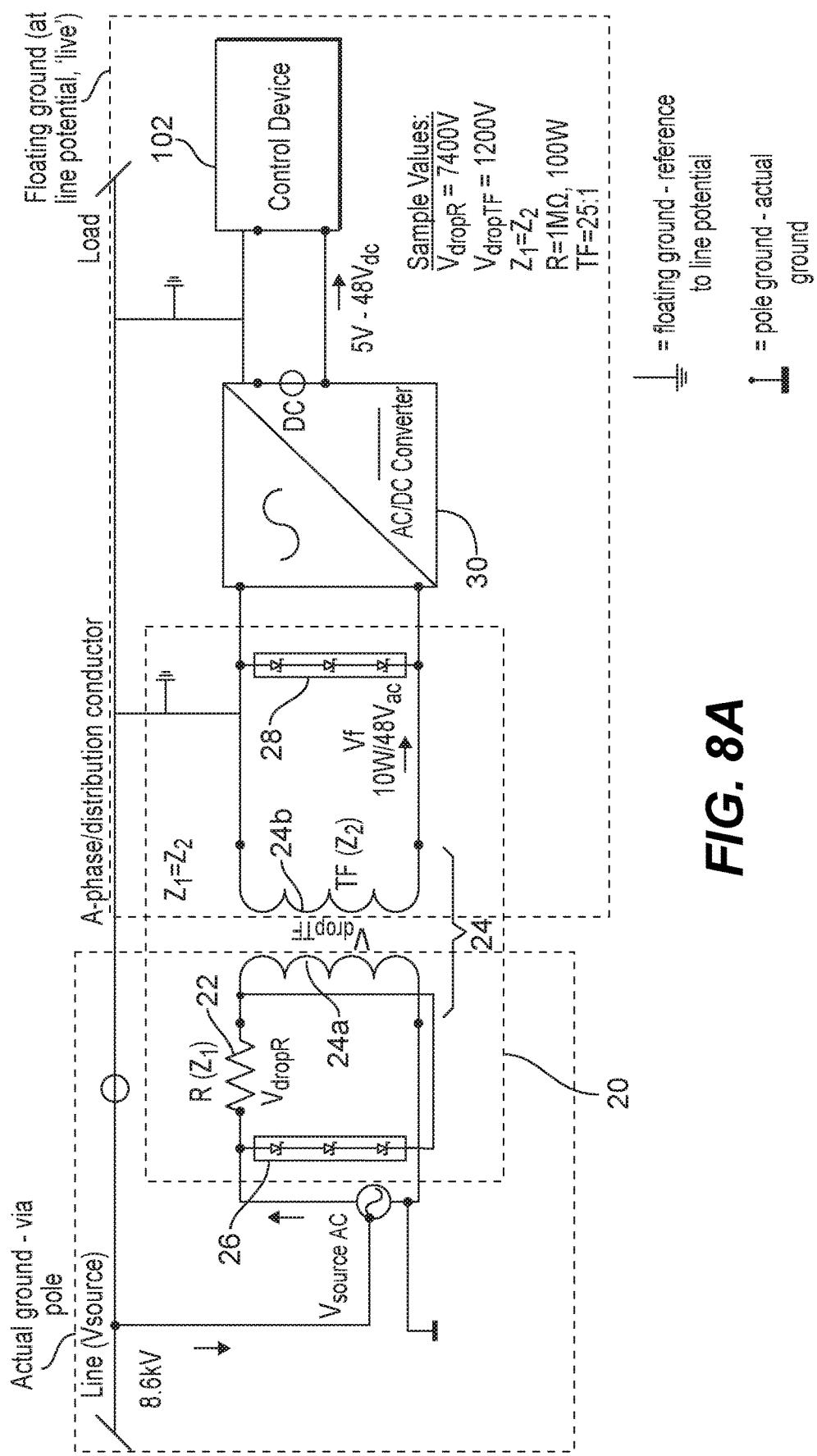
FIG. 8A is an exemplary circuit diagram of the internal components of the circuit of FIG. 7.
Figure 9:
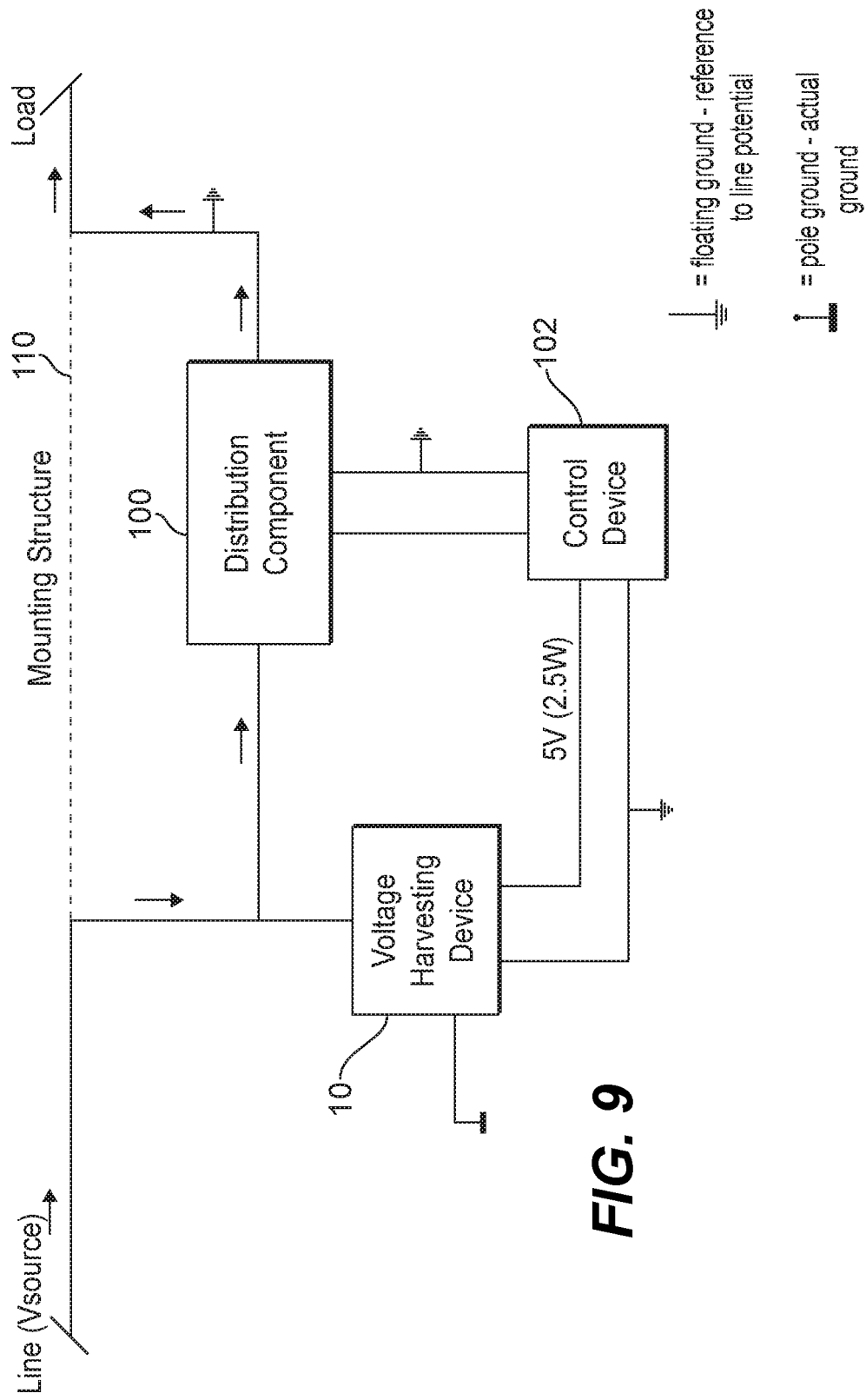
FIG. 9 is a block diagram of an exemplary embodiment of a single-phase power distribution system architecture utilizing the voltage harvesting device according to the present disclosure, and illustrating the voltage harvesting device connected to a line source and providing an exemplary power output to a control device with a hard wire connection between the control device and a distribution component.
Figure 10:
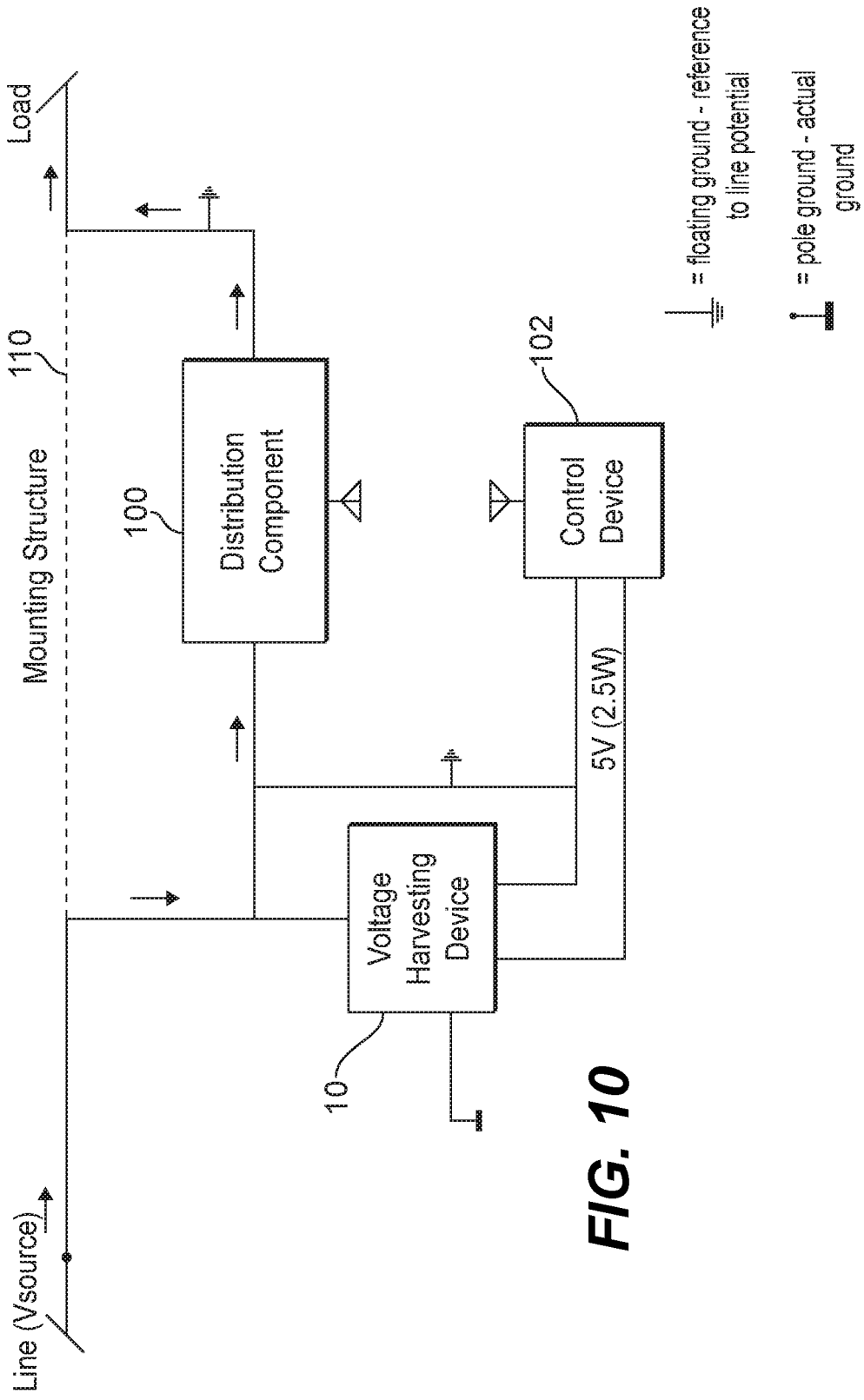
FIG. 10 is a block diagram of an exemplary embodiment of a single-phase power distribution system architecture utilizing the voltage harvesting device, and illustrating the voltage harvesting device connected to a line source and providing power to a low wattage device with a wireless connection between the control device and the distribution component.

Referring to FIGS. 9 and 10, exemplary embodiments of a single-phase power distribution system architecture incorporating the voltage harvesting device according to the present disclosure are shown. In the exemplary embodiment of FIG. 9, the distribution component 100 is a recloser, the control device 102 is a recloser peripheral device, such as a communication module, and the voltage harvesting device 10 includes one of the embodiments shown in FIGS. 8 and 9. The voltage harvesting device 10 can be mounted to a utility pole and the recloser 100 can be mounted to one end of the voltage harvesting device 10, as seen in FIGS. 11 and 12. The voltage harvesting device 10 is connected to the line phase conductor having a line voltage (Vsource), e.g., an 8.66 kV source line voltage. When triggered, the recloser 100 would open, disconnecting the load from the line voltage (Vsource). Whether the recloser 100 is closed or open, the line voltage (Vsource) is fed to the voltage harvesting device 10 from the source side, which transforms the line voltage (Vsource), e.g., the 8.66 kV to 48 VAC at 10 watts, and the voltage converter 30 converts the 48 VAC to 5 VDC at 2.5 watts. The 5 VDC at 2.5 watts is output by the voltage harvesting device 10 and fed to the recloser communication module 102 which can be used to communicate and power a control element for the operation of the recloser 100 via an interface, such as a serial port or hardwire connection, or wireless connection (see, FIG. 10) between the recloser communication module 102 and the recloser 100. In one embodiment, the communication module 102 can be utilized to provide power to charge capacitors or other energy storage elements in the recloser in order to perform functions, such as closing or opening the device after an open circuit or unloaded condition.

In the exemplary embodiment of FIG. 10, the distribution component 100 is a recloser, the control device 102 is a recloser wireless communication and/or control device, such as an RTU, and the voltage harvesting device 10 includes one of the embodiments shown in FIGS. 8 and 9. The voltage harvesting device 10 can be mounted to a utility pole and the recloser 100 can be mounted to one end of the voltage harvesting device 10, as seen in FIGS. 11 and 12. The voltage harvesting device 10 is connected to a single phase line conductor having a line voltage (Vsource), e.g., an 8.66 kV line voltage. When triggered, the recloser 100 would open, disconnecting the load from the line voltage (Vsource). Whether the recloser 100 is closed or open, the source line voltage (Vsource) is fed to the voltage harvesting device 10 which transforms the line voltage (Vsource), e.g., the 8.66 kV, to 48 VAC at 10 watts and the voltage converter 30 converts the 48 VAC to 5 VDC at 2.5 watts. The 5 VDC at 2.5 watts is output by the voltage harvesting device 10 and fed to the communication and/or control device 102 which may control the operation of the recloser 100 via wireless communication between the communication and/or control device 102 and the recloser 100 using known communication techniques and protocols.

In another exemplary embodiment described with reference to FIG. 10, the control device 102 may be independent of the distribution component 100 or may be a distribution component itself, having additional circuitry within it to communicate and transmit or indicate data regarding line conditions.

Figure 13:
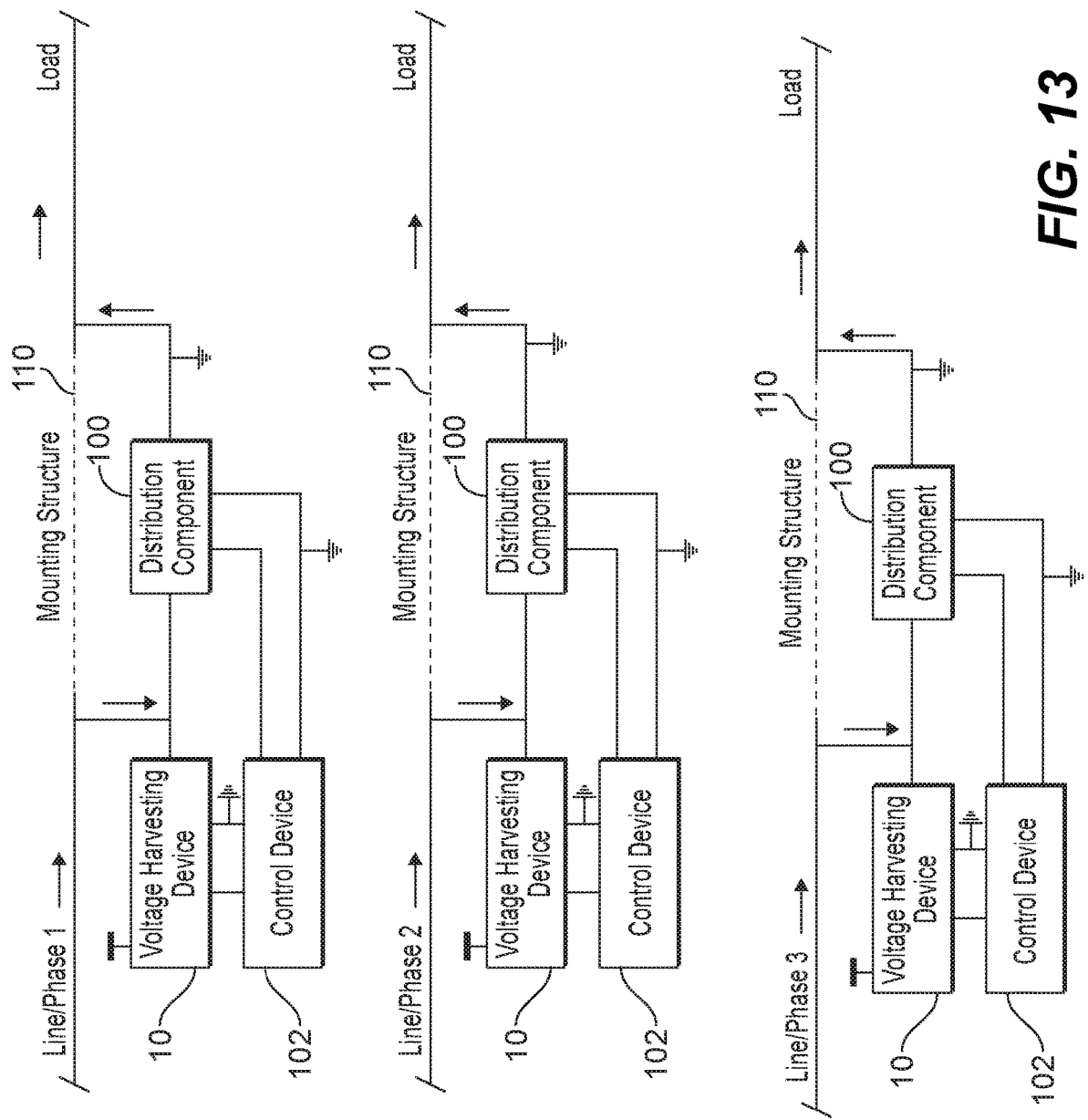
FIG. 13 is a block diagram of an exemplary embodiment of a three-phase power distribution system architecture utilizing multiple voltage harvesting devices according to the present disclosure, and illustrating a voltage harvesting device connected to a line source of each of three phases and providing power to a control device with a hard wire connection between the control device and a distribution component.
Figure 14:
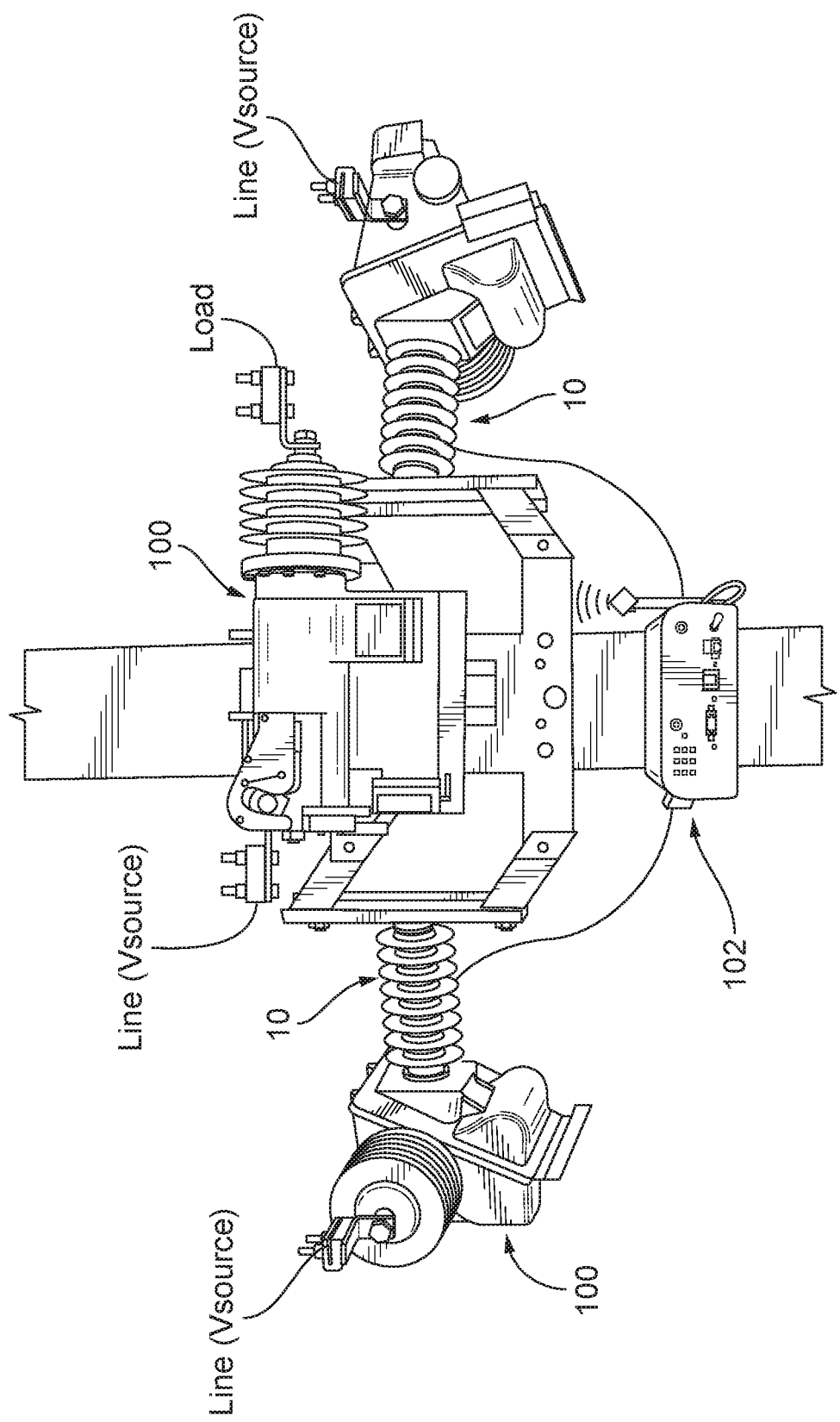
FIG. 14 is a perspective view of the three-phase power distribution system architecture utilizing multiple voltage harvesting devices of FIG. 13, and illustrating three reclosers attached to three voltage harvesting devices, each of which is connected to a line source of one of three phases and providing power to a control device which further communicates with at least one distribution component.
Figure 15:
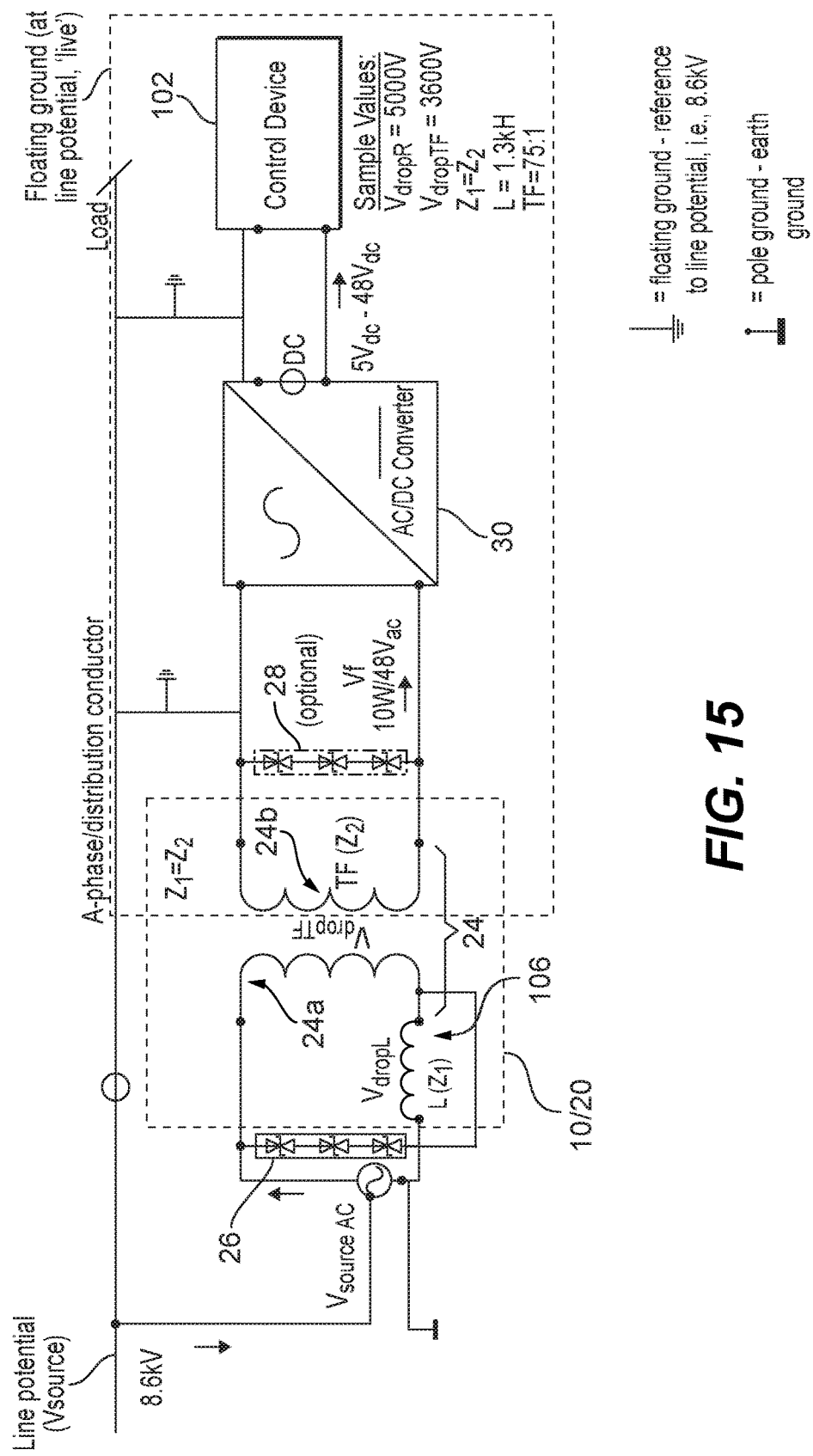
FIG. 15 is another exemplary circuit diagram of the internal components of the transformation circuitry of FIGS. 4, 6 and 8.

Referring to FIGS. 13 and 14, an exemplary embodiment of a three-phase power distribution system architecture incorporating the voltage harvesting device according to the present disclosure is shown. In this exemplary embodiment, each phase (1, 2, or 3) of a three-phase line is fed into a separate voltage harvesting device 10, the output of which is fed to a separate control device 102, such as an RTU, which controls one or more separate distribution components 100 similar to that shown in FIGS. 9 and 10 and described above. In the embodiment of FIG. 13 the control devices 102 are hardwired to the distribution component 100. In the embodiment of FIG. 14 a control device 102 (e.g., an RTU) wirelessly communicates with multiple distribution components 100 and is powered via one or more of the voltage harvesting devices 10 on each of the multiple distribution components 100

The voltage harvesting device according to the present disclosure may be used with live ungrounded devices or with pole-based control devices, which are usually grounded. It will be understood that various modifications can be made to the embodiments of the present disclosure without departing from the spirit and scope thereof. All values set forth herein are exemplary and can be modified depending upon the line voltage (Vsource) and line continuous wattage, the voltage and power requirements of the control device, and the characteristics and properties of the voltage harvesting device. This includes the values for the physical dimensions and the resistance and power characteristics of the resistor and transformer and other elements used with or incorporated into the voltage harvesting device, such as the overvoltage disconnects and the voltage converter. Additionally, though the voltage harvesting circuitry within the voltage harvesting device may only include the transformation circuit, i.e., the resistor/transformer voltage divider, the voltage harvesting circuitry may also include other elements, such as the first overvoltage disconnect device, the second overvoltage disconnect device and/or the voltage converter. Therefore, the above description should not be construed as limiting the disclosure, but merely as embodiments thereof. Those skilled in the art will envision other modifications within the scope and spirit of the invention as defined by the claims appended hereto.

Referring now to FIGS. 15-18 additional exemplary embodiments of the transformation circuitry 20 according to the present disclosure are shown. These exemplary embodiments of the transformation circuitry 20 may be substituted for the transformation circuitry 20 described herein above. In the exemplary embodiment of FIG. 15, the transformation circuitry 20 includes an inductor 106 and the transformer 24. The transformer 24 is connected between the line voltage (Vsource) and one side of the inductor 106, as shown. The other side of the inductor 106 is connected to pole ground. It is noted that pole ground is earth ground, actual ground or the like. In the exemplary embodiment of FIG. 15, the inductor 106 drops the line voltage (Vsource) by a large factor dependent on the source line voltage. For example, using a 1.3 kH inductor 106 and a transformer 24 with a 75:1 turns ratio, a 15 kV single phase line voltage or 8.66 kV, may be dropped by a factor ranging between about 4.0 kV to about 7.5 kV across the inductor 106. The voltage drop factor may range from about 45-95% of the single phase source voltage. Further, since the inductor 106 is connected in series with the primary winding 24a of the transformer 24, the inductor 106 is subjected to and configured to handling a high continuous wattage. The wattage is dependent upon a number of factors including the inductor size and construction, e.g., parallel configuration. As an example, the high continuous wattage may be in the range of between about 20 W to about 100 W. However, this wattage may change dependent on the line voltage and the output requirements of the circuit. As a non-limiting example, for a single-phase line voltage of 8.6 kV the high continuous wattage may be about 60 W.

Figure 16:
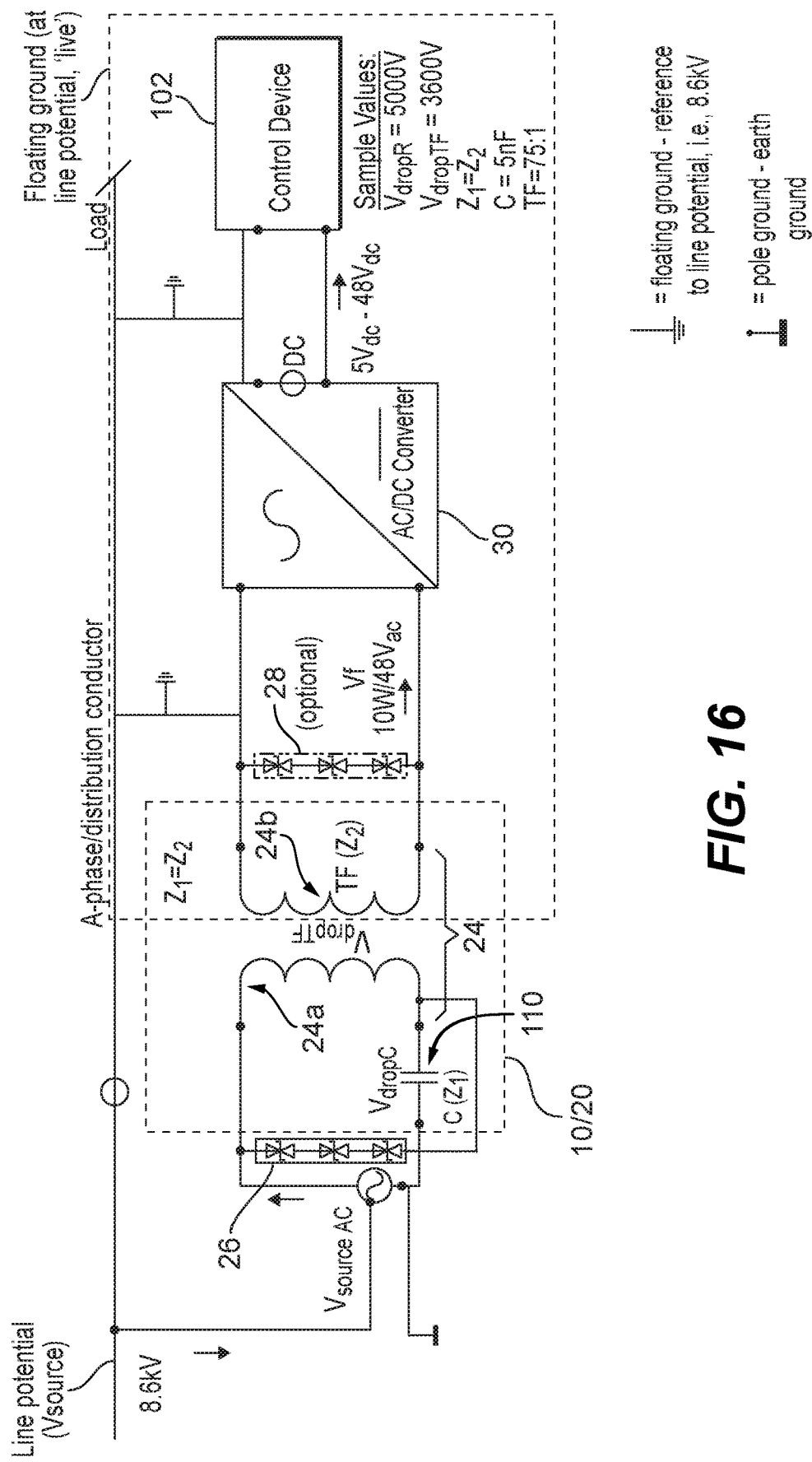
FIG. 16 is another exemplary circuit diagram of the internal components of the transformation circuitry of FIGS. 4, 6 and 8.

In the exemplary embodiment of FIG. 16, the transformation circuitry 20 includes a capacitor 110 and the transformer 24. The transformer 24 is connected between the line voltage (Vsource) and one side of the capacitor 110, as shown. The other side of the capacitor 110 is connected to pole ground. It is noted that pole ground is earth ground, actual ground or the like. In the exemplary embodiment of FIG. 16, the capacitor 110 drops the line voltage (Vsource) by a large factor dependent on the source line voltage. For example, using a 5.0 nF capacitor 110 and a transformer 24 with a 75:1 turns ratio, a 15 kV single phase line voltage or 8.66 kV, may be dropped by a factor ranging between about 4.0 kV to about 7.5 kV across the capacitor 110. The voltage drop factor may range from about 45-95% of the single phase source voltage. Further, since the capacitor 110 is connected in series with the primary winding 24a of the transformer 24, the capacitor 110 is subjected to and configured to handling a high continuous wattage. The wattage is dependent upon a number of factors including the inductor size and construction, e.g., parallel configuration. As an example, the high continuous wattage may be in the range of between about 20 W to about 100 W. However, this wattage may change dependent on the line voltage and the output requirements of the circuit. As a non-limiting example, for a single-phase line voltage of 8.6 kV the high continuous wattage may be about 60 W.

Figure 17:
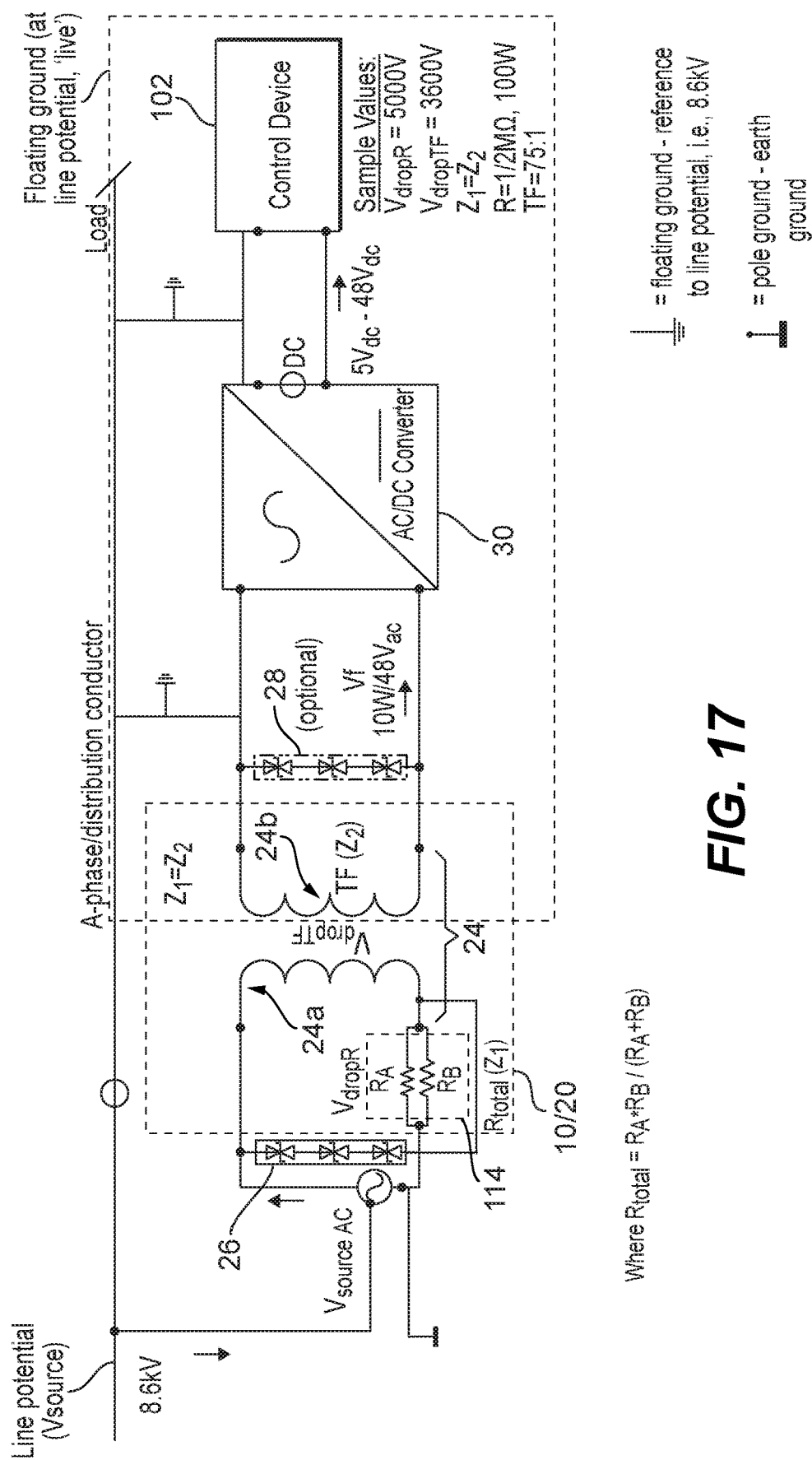
FIG. 17 is another exemplary circuit diagram of the internal components of the transformation circuitry of FIGS. 4, 6 and 8.

In the exemplary embodiment of FIG. 17, the transformation circuitry 20 includes a parallel resistor network 114 and the transformer 24. The parallel resistor network 114 includes two resistors $R_A$ and $R_B$. The transformer 24 is connected between the line voltage (Vsource) and one side of the parallel resistor network 114, as shown. The other side of the parallel resistor network 114 is connected to pole ground. It is noted that pole ground is earth ground, actual ground or the like. In the exemplary embodiment of FIG. 17, the parallel resistor network 114 drops the line voltage (Vsource) by a large factor dependent on the source line voltage. For example, using two 500 KΩ resistors $R_A$ and $R_B$ and a transformer 24 with a 75:1 turns ratio, a 15 kV single phase line voltage or 8.66 kV, may be dropped by a factor ranging between about 4.0 kV to about 7.5 kV across the parallel resistor network 114. The voltage drop factor may range from about 45-95% of the single phase source voltage. Further, since the parallel resistor network 114 is connected in series with the primary winding 24a of the transformer 24, the parallel resistor network 114 is subjected to and configured to handling a high continuous wattage. The wattage is dependent upon a number of factors including the inductor size and construction, e.g., parallel configuration. As an example, the high continuous wattage may be in the range of between about 20 W to about 100 W. However, this wattage may change dependent on the line voltage and the output requirements of the circuit. As a non-limiting example, for a single-phase line voltage of 8.6 kV the high continuous wattage may be about 60 W.

Figure 18:
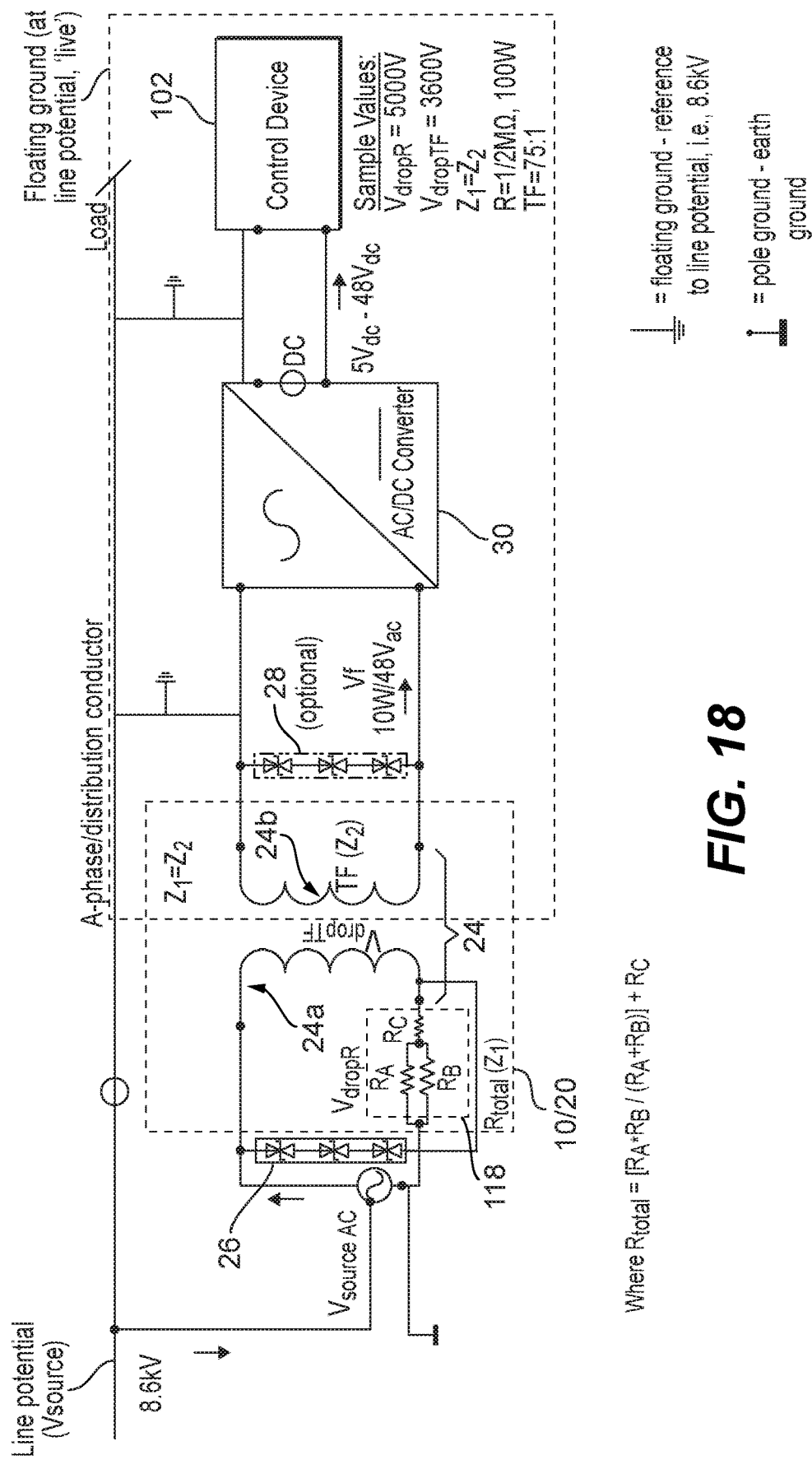
FIG. 18 is another exemplary circuit diagram of the internal components of the transformation circuitry of FIGS. 4, 6 and 8.

In the exemplary embodiment of FIG. 18, the transformation circuitry 20 includes a parallel resistor and a series resistor network 118 and the transformer 24. The parallel resistor and a series resistor network 118 may also be referred to herein as the resistor network 118. The resistor network 118 includes two resistors $R_A$ and $R_B$ in parallel and a resistor $R_C$ in series with the two parallel resistors $R_A$ and $R_B$. In other exemplary embodiments, the resistor network 118 may include two or more individual resistors, e.g., resistors $R_A$ and $R_C$, in series. The transformer 24 is connected between the line voltage (Vsource) and one side of the resistor network 118, as shown. The other side of the resistor network 118 is connected to pole ground. It is noted that pole ground is earth ground, actual ground or the like. In the exemplary embodiment of FIG. 18, the resistor network 118 drops the line voltage (Vsource) by a large factor dependent on the source line voltage. For example, using three 500 KΩ resistors $R_A$, $R_B$ and $R_C$ and a transformer 24 with a 75:1 turns ratio, a 15 kV single phase line voltage or 8.66 kV, may be dropped by a factor ranging between about 4.0 kV to about 7.5 kV across the parallel resistor network 114. The voltage drop factor may range from about 45-95% of the single phase source voltage. Further, since the parallel resistor network 114 is connected in series with the primary winding 24a of the transformer 24, the parallel resistor network 114 is subjected to and configured to handling a high continuous wattage. The wattage is dependent upon a number of factors including the inductor size and construction, e.g., parallel configuration. As an example, the high continuous wattage may be in the range of between about 20 W to about 100 W. However, this wattage may change dependent on the line voltage and the output requirements of the circuit. As a non-limiting example, for a single-phase line voltage of 8.6 kV the high continuous wattage may be about 60 W.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A voltage harvesting device for use in power distribution systems, the voltage harvesting device comprising:
a housing; and
a transformation circuit within the housing, the transformation circuit including at least one first impedance component and at least one second impedance component, the at least one first impedance component having:
a positive input capable of being electrically coupled to a loaded or unloaded source line voltage;
a negative input electrically coupled to the at least one second impedance component; and
an output capable of being coupled to a device, wherein the output and the device both reference a floating ground of the loaded or unloaded source line voltage;
wherein the first impedance component and the second impedance component are arranged as a voltage divider, the voltage divider producing an AC voltage on the output of the first impedance component that is a higher voltage than the loaded or unloaded source line voltage.

2. The voltage harvesting device according to claim 1, wherein the second impedance component is coupled to actual ground.

3. The voltage harvesting device according to claim 2, further comprising a first overvoltage disconnect component electrically coupled between the positive input of the at least one first impedance component and actual ground.

4. The voltage harvesting device according to claim 3, wherein the first overvoltage device comprises one or more daisy-chained bi-directional TVS diodes, FETs, or PTC fuses.

5. The voltage harvesting device according to claim 1, further comprising a second overvoltage disconnect device electrically coupled across the output of the at least one first impedance component.

6. The voltage harvesting device according to claim 5, wherein the second overvoltage device comprises one or more daisy-chained bi-directional TVS diodes, FETs, or PTC fuses.

7. The voltage harvesting device according to claim 1, further comprising a converter electrically coupled to the output of the at least one first impedance component that converts the AC output voltage of the at least one first impedance component to a DC voltage.

8. The voltage harvesting device according to claim 1, wherein the at least one first impedance component is a transformer.

9. The voltage harvesting device according to claim 1, wherein the at least one second impedance component is a resistor.

10. The voltage harvesting device according to claim 1, wherein the at least one second impedance component comprises a parallel resistor network.

11. The voltage harvesting device according to claim 1, wherein the at least one second impedance component comprises two or more parallel resistors and a series resistor.

12. The voltage harvesting device according to claim 1, wherein the at least one second impedance component comprises two or more resistors in series.

13. A voltage harvesting device for use in high voltage AC power distribution systems, the voltage harvesting device comprising:
a housing; and
a transformation circuit within the housing, the transformation circuit including:
a transformer having a primary side with a first input terminal electrically connected to a loaded or unloaded AC line voltage source and a second input terminal, and a secondary side of the transformer having a first output terminal capable of being electrically connected to a floating ground referenced to the loaded or unloaded source AC line voltage and a second output terminal capable of producing an AC voltage above the voltage of the loaded or unloaded AC line voltage source; and
at least one resistor having a first terminal electrically connected to the second input terminal of the transformer and a second terminal connected to actual ground.

14. The voltage harvesting device of claim 13, wherein the AC voltage produced by the second output terminal of the transformer is in the range of about 25 VAC to 250 VAC relative to the loaded or unloaded AC line voltage source.

15. The voltage harvesting device according to claim 13, further comprising a first overvoltage disconnect device electrically coupled between the first input terminal of the transformer and the second terminal of the resistor.

16. The voltage harvesting device according to claim 15, wherein the first overvoltage device comprises one or more daisy-chained bi-directional TVS diodes, FETs, or PTC fuses.

17. The voltage harvesting device according to claim 13, further comprising a second overvoltage disconnect device electrically coupled between the first and second output terminals of the secondary side of the transformer.

18. The voltage harvesting device according to claim 17, wherein the second overvoltage device comprises one or more daisy-chained bi-directional TVS diodes, FETs, or PTC fuses.

19. The voltage harvesting device according to claim 13, further comprising a converter electrically coupled between the first and second output terminals of the secondary side of the transformer that converts the AC output voltage across the first and second output terminals of the secondary side of the transformer to a DC voltage.

20. A voltage harvesting circuit for use in high voltage AC power distribution systems, the voltage harvesting circuit comprising a transformer having a primary side with a first input terminal electrically connected to a loaded or unloaded AC line voltage source and a second input terminal, and a secondary side of the transformer having a first output terminal capable of being electrically connected to a floating ground referenced to the loaded or unloaded source AC line voltage and a second output terminal capable of producing an AC voltage above the voltage of the loaded or unloaded AC line voltage source; and at least one impedance component having a first terminal electrically connected to the second input terminal of the transformer and a second terminal connected to actual ground.

21. The voltage harvesting circuit according to claim 20, wherein the at least one second impedance component is a resistor.

22. The voltage harvesting circuit according to claim 20, wherein the at least one second impedance component comprises a parallel resistor network.

23. The voltage harvesting circuit according to claim 20, wherein the at least one second impedance component comprises two or more parallel resistors and a series resistor.

24. The voltage harvesting circuit according to claim 20, wherein the at least one second impedance component comprises two or more resistors in series.

25. The voltage harvesting circuit according to claim 20, further comprising a first overvoltage disconnect device electrically coupled between the first input terminal of the transformer and the second terminal of the resistor.

26. The voltage harvesting circuit according to claim 25, wherein the first overvoltage device comprises one or more daisy-chained bi-directional TVS diodes, FETs, or PTC fuses.

27. The voltage harvesting circuit according to claim 20, further comprising a second overvoltage disconnect device electrically coupled between the first and second output terminals of the secondary side of the transformer.

28. The voltage harvesting circuit according to claim 27, wherein the second overvoltage device comprises one or more daisy-chained bi-directional TVS diodes, FETs, or PTC fuses.

29. The voltage harvesting device according to claim 20, further comprising a converter electrically coupled between the first and second output terminals of the secondary side of the transformer that converts the AC output voltage across the first and second output terminals of the secondary side of the transformer to a DC voltage.

\* \* \* \* \*